United States Patent [19]
Cho et al.

[11] Patent Number: 5,821,420
[45] Date of Patent: Oct. 13, 1998

[54] VIBRATION-TYPE GYRO APPARATUS FOR CALCULATING ANGULAR VELOCITY

[75] Inventors: Akihiro Cho, Tochigi-ken; Takeshi Hojo, Kuroiso; Shigeru Nakamura, Kuroiso; Kazuteru Sato, Kuroiso, all of Japan

[73] Assignee: Tokimec, Inc., Tokyo, Japan

[21] Appl. No.: 782,968

[22] Filed: Jan. 14, 1997

[30] Foreign Application Priority Data

Jan. 16, 1996 [JP] Japan .................................... 8-005177

[51] Int. Cl.$^6$ ...................................................... G01P 9/00
[52] U.S. Cl. ................................ 73/504.16; 73/504.02
[58] Field of Search ........................... 73/504.12, 504.16, 73/504.02, 504.04, 504.08; 310/316, 321, 370; 340/671

[56] References Cited

U.S. PATENT DOCUMENTS

| | | | |
|---|---|---|---|
| 5,434,467 | 7/1995 | Abe | 73/504.12 |
| 5,451,828 | 9/1995 | Tomikawa | 73/504.16 |
| 5,625,145 | 4/1997 | Maeno | 73/504.12 |

*Primary Examiner*—Christine K. Oda
*Attorney, Agent, or Firm*—Bauer & Schaffer

[57] ABSTRACT

This invention relates to a vibration-type gyro apparatus for measuring an angular velocity using the Coriolis force exerted on a tuning fork. The tuning fork has two vibrational members symmetric about a Z axis. The two vibrational members vibrate along Z axis and are displaced along a Y axis by the Coriolis force. Each of the two vibrational members includes a cantilevered tabular member arranged along an XZ plane and has a shape symmetric about the center axis thereof. Electrode sections are formed on the two sides of the vibrational members, and electrodes are formed in the internal space of a casing at positions corresponding to the electrode sections. The electrodes are arranged by being deviated outward or inward of the center axis of the vibration members with respect to the electrode sections. Each of the electrodes is supplied with a displacement detection AC voltage and a control voltage from a detection and drive circuit.

12 Claims, 19 Drawing Sheets

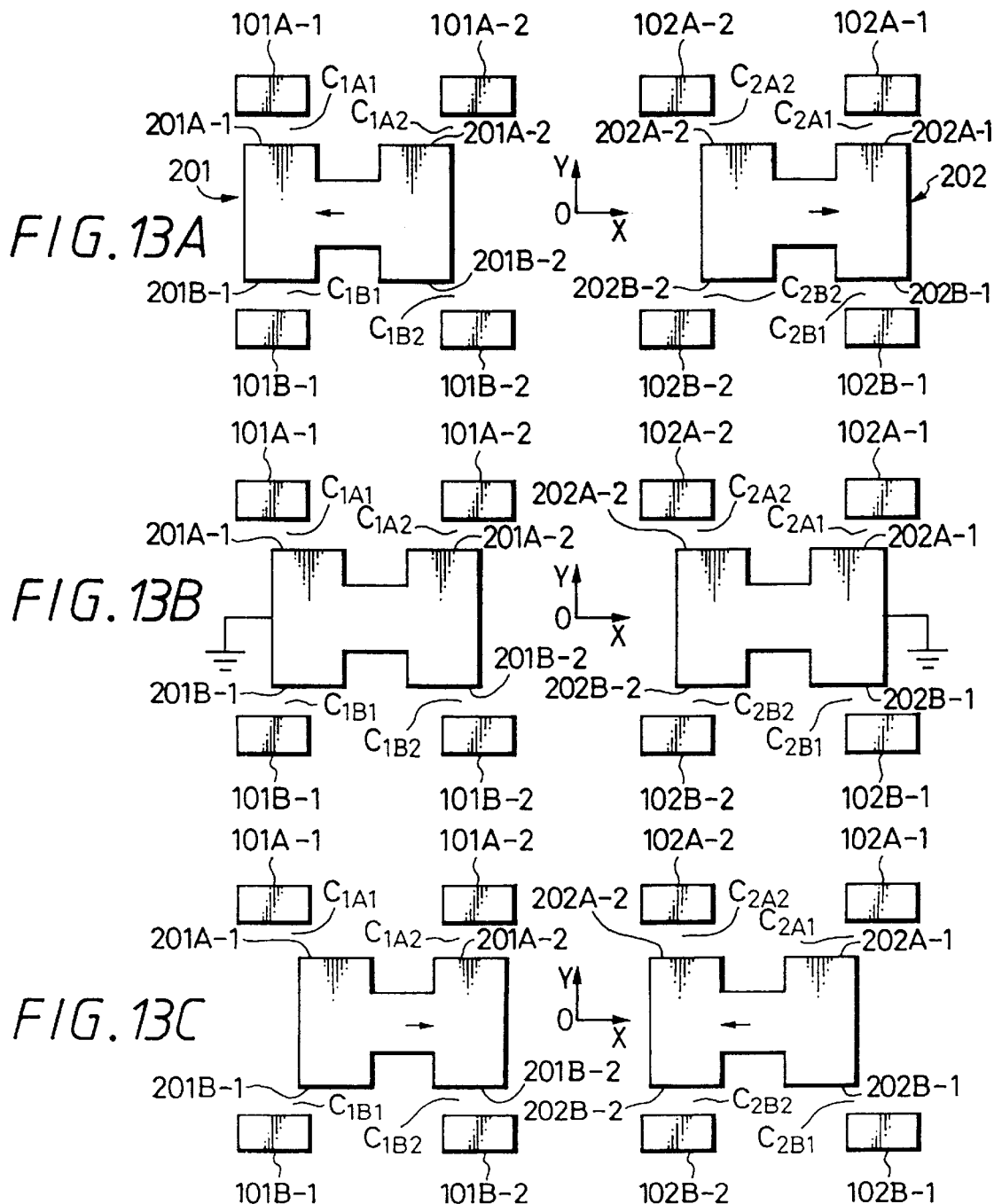

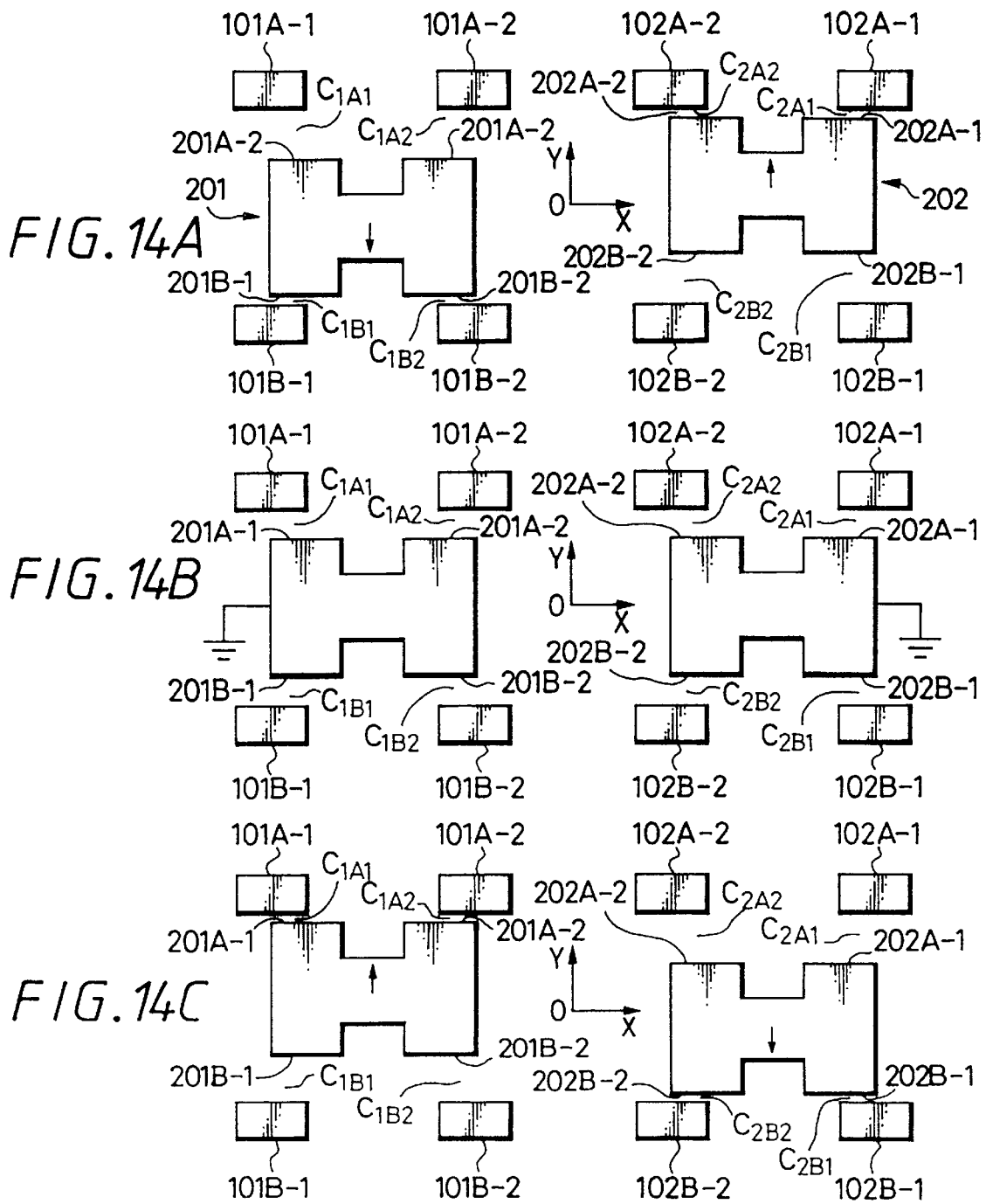

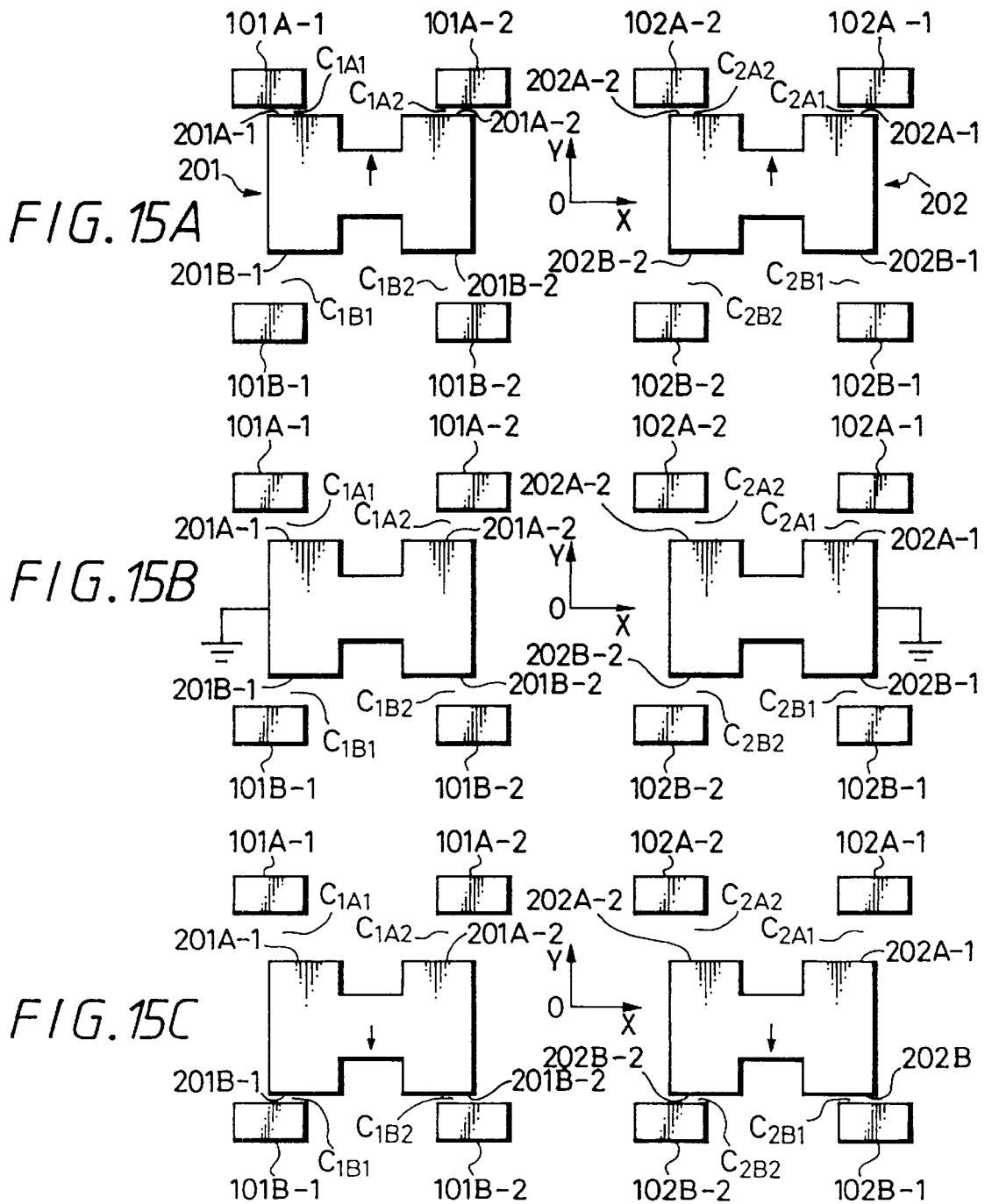

FIG. 16

| Capacitor | Electrode/Electrode Section | Electrostatic Capacitance/Voltage | (1) Vibration of Tuning Fork | (2) Coriolis Force | (3) Acceleration Along Y Axis |
|---|---|---|---|---|---|
| 1A1 | 101A-1 / 201A-1 | $C_{1A1}$ / $AC_{1A1}$ | I/− | R/+ | I/− |
| 1A2 | 101A-2 / 201A-2 | $C_{1A2}$ / $AC_{1A2}$ | R/+ | R/+ | I/− |
| 1B1 | 101B-1 / 201B-1 | $C_{1B1}$ / $AC_{1B1}$ | I/− | I/− | R/+ |
| 1B2 | 101B-2 / 201B-2 | $C_{1B2}$ / $AC_{1B2}$ | R/+ | I/− | R/+ |
| 2A1 | 102A-1 / 202A-1 | $C_{2A1}$ / $AC_{2A1}$ | I/− | I/− | I/− |
| 2A2 | 102A-2 / 202A-2 | $C_{2A2}$ / $AC_{2A2}$ | R/+ | I/− | I/− |
| 2B1 | 102B-1 / 202B-1 | $C_{2B1}$ / $AC_{1B1}$ | I/− | R/+ | R/+ |
| 2B2 | 102B-2 / 202B-2 | $C_{2B2}$ / $AC_{2B2}$ | R/+ | R/+ | R/+ |
|  |  |  | FIG. 13A | FIG. 14A | FIG. 15A |

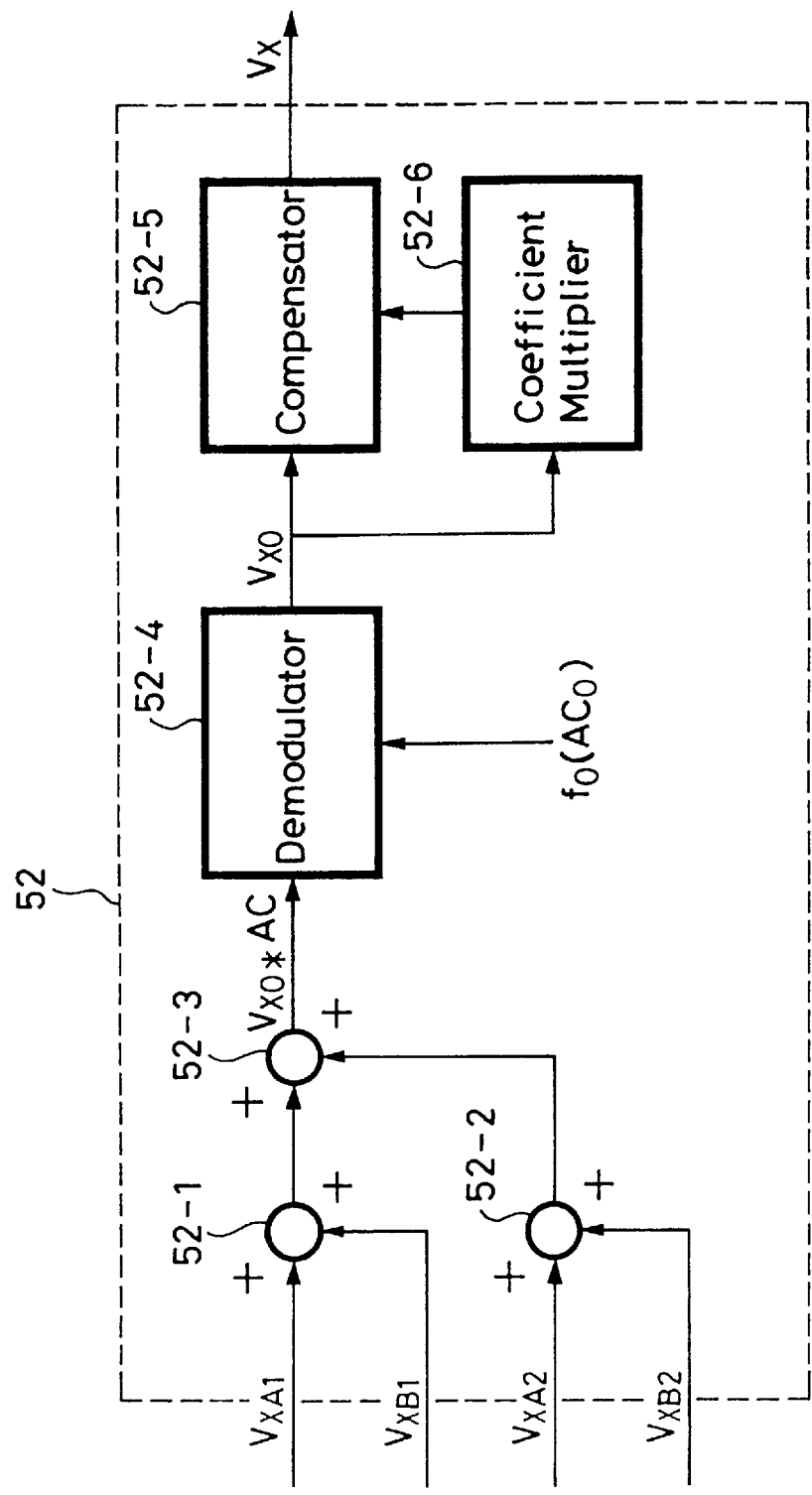

F I G. 18A
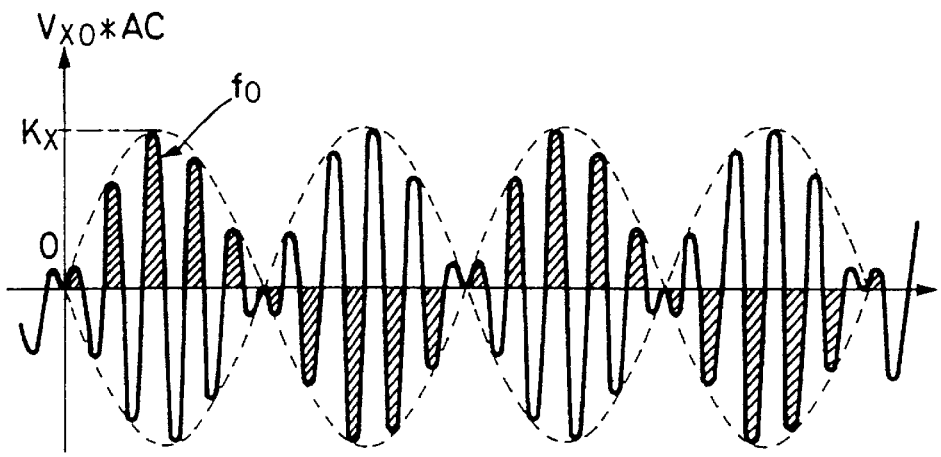
F I G. 18B
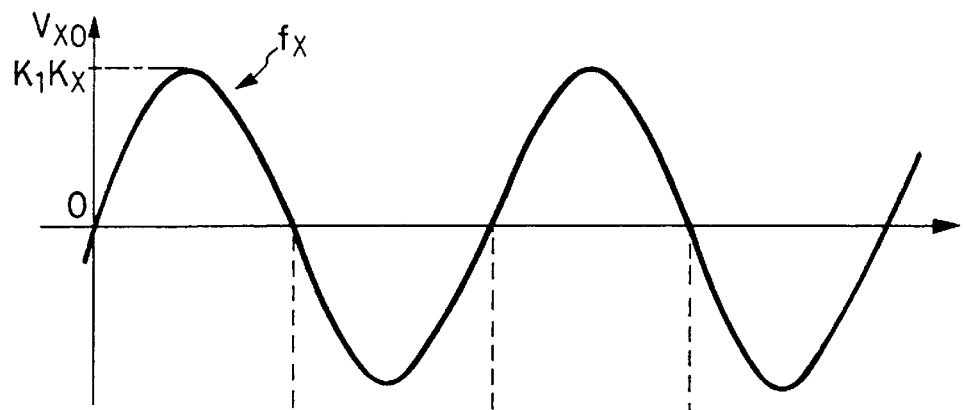
F I G. 18C
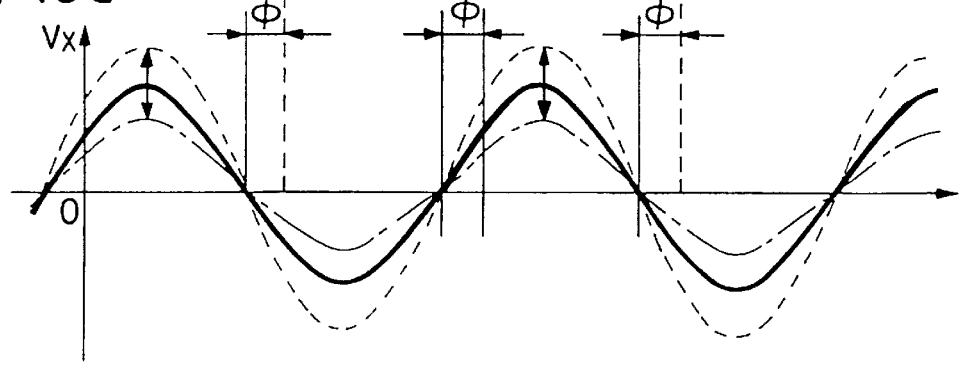

VIBRATION-TYPE GYRO APPARATUS FOR CALCULATING ANGULAR VELOCITY

BACKGROUND OF THE INVENTION

The present invention relates to an improved vibration-type gyro apparatus for measuring angular velocity using the Coriolis force exerted on vibrational members.

An example of a conventional vibration-type gyro apparatus is shown in FIGS. 1 and 2. The vibration-type gyro apparatus shown in FIGS. 1 and 2 is configured to measure angular velocity using the Coriolis force exerted on vibrational members. In the shown example, a tuning fork is used as the vibrational member. The conventional gyro apparatus comprises a tuning fork 1, a deflection shaft 2 mounted on the tuning fork 1 and a base plate 3 for supporting the deflection shaft 2.

The tuning fork 1 has a drive coil 4 for vibrating the tuning fork 1, a displacement detector 5 for detecting the vibratory displacement of the tuning fork 1 and a torsion displacement detector 6 for detecting the torsion displacement of the deflection shaft 2, mounted thereon. As shown in FIG. 2, the gyro apparatus further comprises a drive amplifier 7 and a demodulator 8.

As shown, the (Z—Z) axis is taken along the center line of the deflection shaft 2. The tuning fork 1 is arranged symmetrically about the (Z—Z) axis, so that the (Z—Z) axis is the input axis of the tuning fork. The direction V of vibration of the tuning fork 1 is perpendicular to the (Z—Z) axis as shown. In the case where the angular velocity $\Omega$ is input around the (Z—Z) axis while the tuning fork 1 is vibrating along the direction V, the Coriolis force $F_C$ corresponding to the input angular velocity $\Omega$ is exerted on the tuning fork 1. The direction of the Coriolis force Fc is perpendicular to both the (Z—Z) axis and the direction V of vibration of the tuning fork 1. Since the two vibrational members (forked members) of the tuning fork 1 vibrate in opposite directions ±V, the Coriolis forces $F_C$ exerted on the two vibrational members are in opposite directions.

Consequently, the Coriolis force $F_C$ exerted on the tuning fork 1 is a couple, and therefore the tuning fork 1 rotationally vibrates alternately around the (Z—Z) axis. The magnitude of the rotational vibration is proportional to the magnitude of the Coriolis force $F_C$, and the period of vibration is equal to the period of the tuning fork 1.

FIG. 2 shows a control system for the conventional gyro apparatus shown in FIG. 1. The control system includes a detection and drive system having a displacement detector 5, a drive amplifier 7 and a drive coil 4. The control system also includes an angular velocity detection system having a torsion displacement detector 6 and a demodulator 8. The detection and drive system detects the displacement along the direction V of the tuning fork 1 by the displacement detector 5 and supplies the output thereof to the drive coil 4 through the drive amplifier 7. In this way, the tuning fork 1 vibrates at a predetermined frequency.

The angular velocity detection system detects the torsion displacement of the tuning fork 1 by the torsion displacement detector 6 and supplies the output thereof to the demodulator 8. The demodulator 8 determines an input angular velocity $\Omega$ by synchronously commutation of the output of the torsion displacement detector 6 using the output signal of the drive amplifier 7.

The conventional vibration-type gyro apparatus is configured to cantilever a comparatively heavy tuning fork 1 by the deflection shaft 2. As a result, when the deflection shaft 2 has a sufficiently large rigidity, the amplitude of the rotational vibration of the tuning fork 1 around (Z—Z) axis is reduced to such an extent that sensitivity to the input angular velocity $\Omega$ is reduced. If the rigidity of the deflection shaft 2 is sufficiently reduced, on the other hand, the heavy tuning fork 1 cannot be supported.

The conventional vibration-type gyro apparatus is required to have at least two displacement detectors including the displacement detector 5 for detecting the vibratory displacement of the tuning fork 1 and the torsion displacement detector 6 for detecting the rotational displacement of the tuning fork 1, resulting in an apparatus having a bulky and complicated structure.

Another shortcoming of the conventional vibration-type gyro apparatus is the drive coil 4 and the displacement detector 6 are affected by external magnetic fields and, therefore, cannot achieve a high detection accuracy. Even in the case where piezoelectric devices are used in place of the drive coil 4 and the displacement detector 6, errors may still result due to the differing coefficients of expansion of the deflection axis 2 and the tuning fork 1 on which the piezoelectric device is to be mounted.

It is, therefore, an object of the present invention to provide a vibration-type gyro apparatus that is simple in structure and suitably reduced in size.

It is another object of the present invention to provide a gyro apparatus that does not require two displacement detectors.

SUMMARY OF THE INVENTION

According to the present invention, a gyro apparatus is provided comprising a tuning fork having an input axis along a Z axis and adapted to vibrate at a predetermined frequency along an X axis, and a casing for housing the tuning fork, wherein the angular velocity $\Omega$ around the Z axis is determined by detecting the Coriolis generated in the tuning fork along a Y axis, the gyro apparatus further comprising:

two tabular vibrational members arranged in the XZ plane symmetrically about the Z axis with respect to each other and each supported in cantilever by the tuning fork symmetrically about the center line thereof;

a plurality of electrode sections formed on the two sides of the vibrational members;

a plurality of electrodes arranged in the internal space of the casing at positions corresponding to the electrode sections by being deviated either outwardly or inwardly of the center axis of the vibrational members with respect to the electrode sections, respectively; and a detection and drive circuit including each of the electrodes and corresponding one of the electrode sections for applying a displacement detection AC voltage to a capacitor;

wherein the displacement along the Y axis of the vibrational members caused by the Coriolis force is detected by the change of the displacement detection AC voltage.

According to the present invention, a gyro apparatus is provided, wherein the detection and drive circuit applies a drive AC voltage to the capacitor in addition to the displacement detection voltage, and the vibrational members are vibrated in the X direction by the drive AC voltage.

According to the present invention, a gyro apparatus is provided, wherein each of the vibrational members is supported by a U-shaped member having two parallel support members, and the center axis of each vibrational member is always maintained parallel with the Z axis even in the case where the two support members are deflected.

According to the present invention, a gyro apparatus is provided comprising two tabular cover members and a base plate held between the cover members, wherein the base plate includes the tuning fork and a frame-shaped portion surrounding the tuning fork, the internal space of the casing being defined by the two cover members and the frame-shaped portion of the base plate held between the two cover members.

According to the present invention, a gyro apparatus is provided, wherein the casing is made of an insulating material, each of the electrodes is made of a thin metal film formed on the inner surface of the casing, the vibrational members are made of a conductive material, and each of the electrode sections is made of a protrusion formed on the vibrational members.

According to the present invention, a gyro apparatus is provided, wherein the electrodes and the electrode sections are made of a multiplicity of band-shaped portions arranged symmetrically about a plane passing through the center axis of the vibrational members and parallel with the YZ plane. The width of each of the band-shaped portions is several tenths of $\mu$m.

According to the present invention, a gyro apparatus is provided, wherein the two tabular cover members are made of glass and the base plate is made of single crystal silicon (Si).

According to the present invention, a gyro apparatus is provided, wherein the internal space of the casing is hermetically sealed and maintained in vacuum, the casing is formed with a recess communicating with the internal space, and a receiver member for maintaining the vacuum is arranged in the recess.

According to the present invention, a gyro apparatus is provided, further comprising a stopper for limiting the displacement of the vibrational members along the Y axis, and the stopper is a thin film of an insulating material formed on the surfaces of the electrode sections and/or the electrodes.

BRIEF DESCRIPTION OF THE DRAWINGS

FIGS. 13A to 13C are diagrams showing the vibratory displacement of the tuning fork.

FIGS. 14A to 14C are diagrams showing the vibratory displacement of the tuning fork due to the Coriolis force.

FIGS. 15A to 15C are diagrams showing the displacement of the tuning fork due to the acceleration.

FIG. 16 is a chart showing the displacement of the tuning fork, the change in the electrostatic capacitance of the capacitor and the change in the voltage applied to the capacitor.

FIG. 17 is a diagram showing an example configuration of a control calculation section according to the present invention.

FIGS. 18A to 18C show waveforms showing the operation of the control calculation section according to the present invention.

DETAILED DESCRIPTION OF THE PREFERRED EMBODIMENTS

Figure 3:
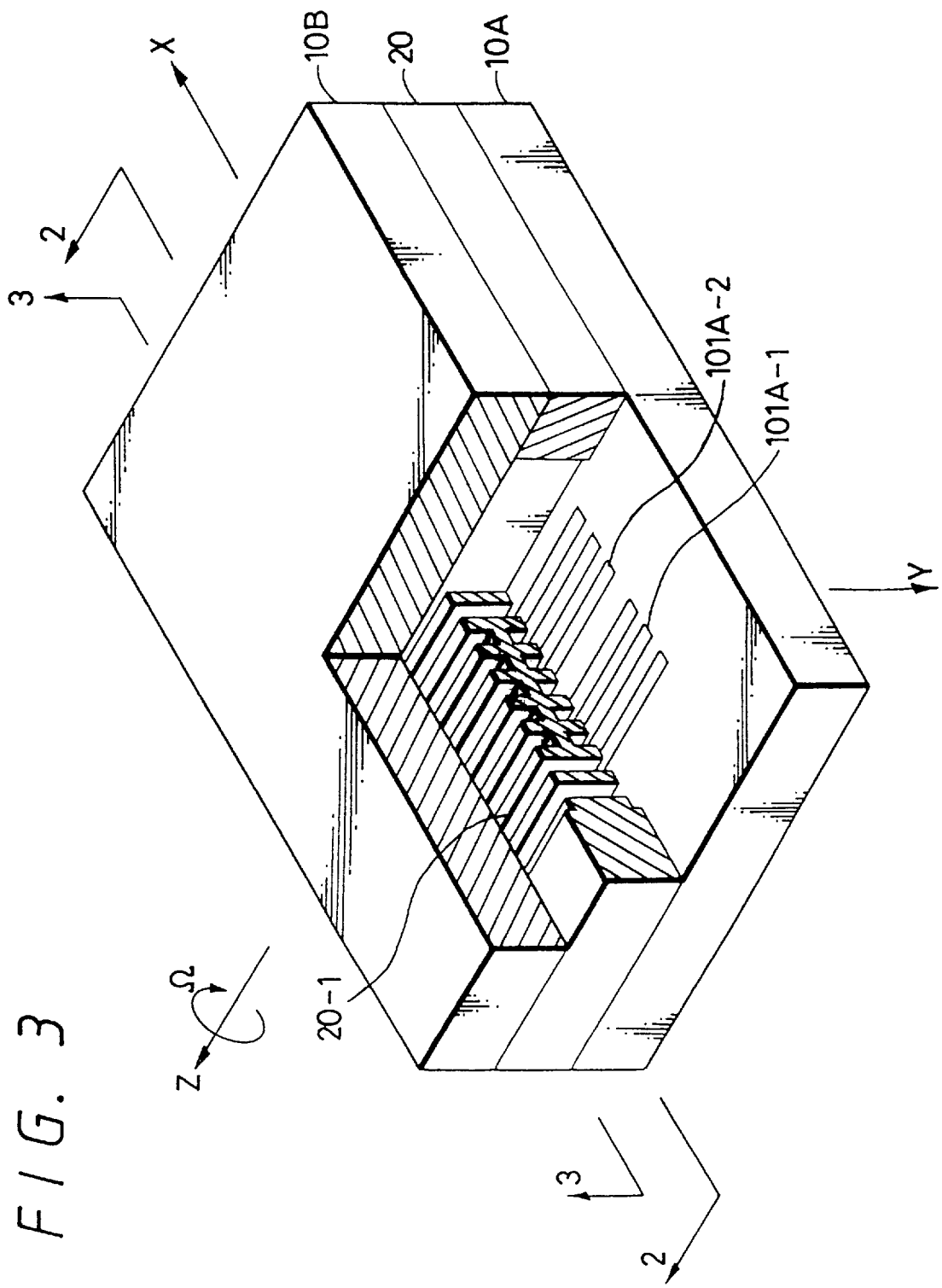
FIG. 3 is a partially cut-away perspective view of the vibration-type gyro apparatus according to the present invention.

FIG. 3 shows a vibration-type gryo apparatus according to the present invention. This vibration-type gyro apparatus comprises two cover members 10A and 10B and a base plate 20 held therebetween. The cover members 10A, 10B and the base plate 20 are thin tabular members, and the vibration-type gyro apparatus is parallelopipedally shaped as a whole.

As shown, a coordinate system is established in FIG. 3 with the X axis is set along the length of the apparatus, the Y axis along the thickness and the Z axis along the width of the vibration-type gyro apparatus. Also, the origin 0 of the coordinate system is taken at the center of the apparatus. The main surfaces are parallel with the XY plane.

As seen in the Figures, the base plate 20 comprises a tuning fork. The tuning fork comprises a pair of tuning fork portions 20-1, 20-2. The two tuning fork portions 20-1, 20-2 are arranged along the XZ plane symmetrically about the Z axis. Consequently, the vibration-type gyro apparatus according to the present invention has an input axis along the Z axis. A plurality of electrodes are formed on the inner surface of each cover member 10A and 10B.

The structure of the base plate 20 will be explained with reference to FIGS. 4, 5 and 6. The base plate 20 has a shape symmetrical about the YZ plane and also about the Z axis. The base plate 20 is provided with top and bottom surfaces. A rectangular shallow recess 20A is provided in both surfaces of base plate 20. A pair of tuning fork portions 20-1, 20-2 are provided in recess 20A. As shown, an E-shaped through hole 20$a$ and a pair of U-shaped through holes 20$b$ and 20$c$ are provided for defining the two tuning fork portions 20-1, 20-2.

Figure 6:
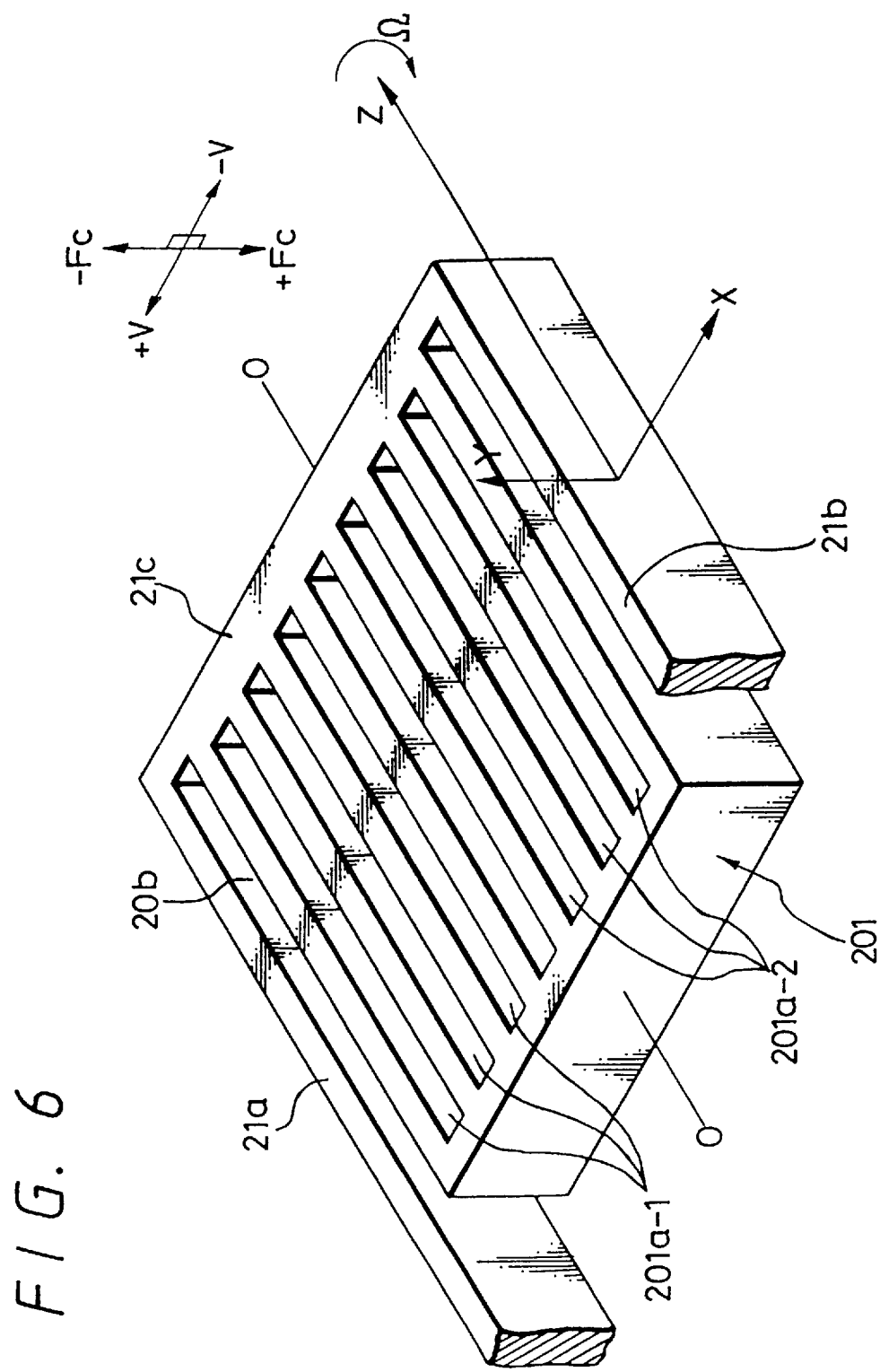
FIG. 6 is a perspective view of the tuning fork showing a broken away portion thereof.

FIG. 6 shows the structure of the tuning fork portion 20-1. The two tuning fork portions 20-1, 20-2 have the same structure, and therefore, the structure of the second tuning fork portion 20-2 will not be explained in detail. The first tuning fork portion 20-1 has a center axis O—O. By way of explanation, a plane containing the center axis O—O and parallel with the YZ plane is called the central axial plane O—O in this specification.

The first tuning fork portion 20-1 is symmetric about the central axis and to the central axial plane O—O and has an upper and lower surface. The tuning fork portion 20-1 includes U-shaped support members 21a, 21b, 21c and a vibrational member 201 interposed between them. The U-shaped support members 21a, 21b, 21c include parallel legs 21a, 21b and a connector 21c connecting the legs 21a, 21b. The vibrational member 201 is connected to the connector 21c.

Vibrational member 201 is supported in cantilever fashion by the two legs 21a, 21b so that the tuning fork portion 20-1 has a cantilevered support structure.

The shape of the vibrational member 201 tuning fork portion 20-1 will be described in detail with reference to FIGS. 4 and 5. As shown, the upper surface and the lower surface of the first vibrational member 201 are provided with a multiplicity of grooves 201A-1, 201A-2 and 201B-1, 201B-2, respectively. Elongate protrusions are formed between these elongate grooves and constitute electrode sections.

Figure 4:
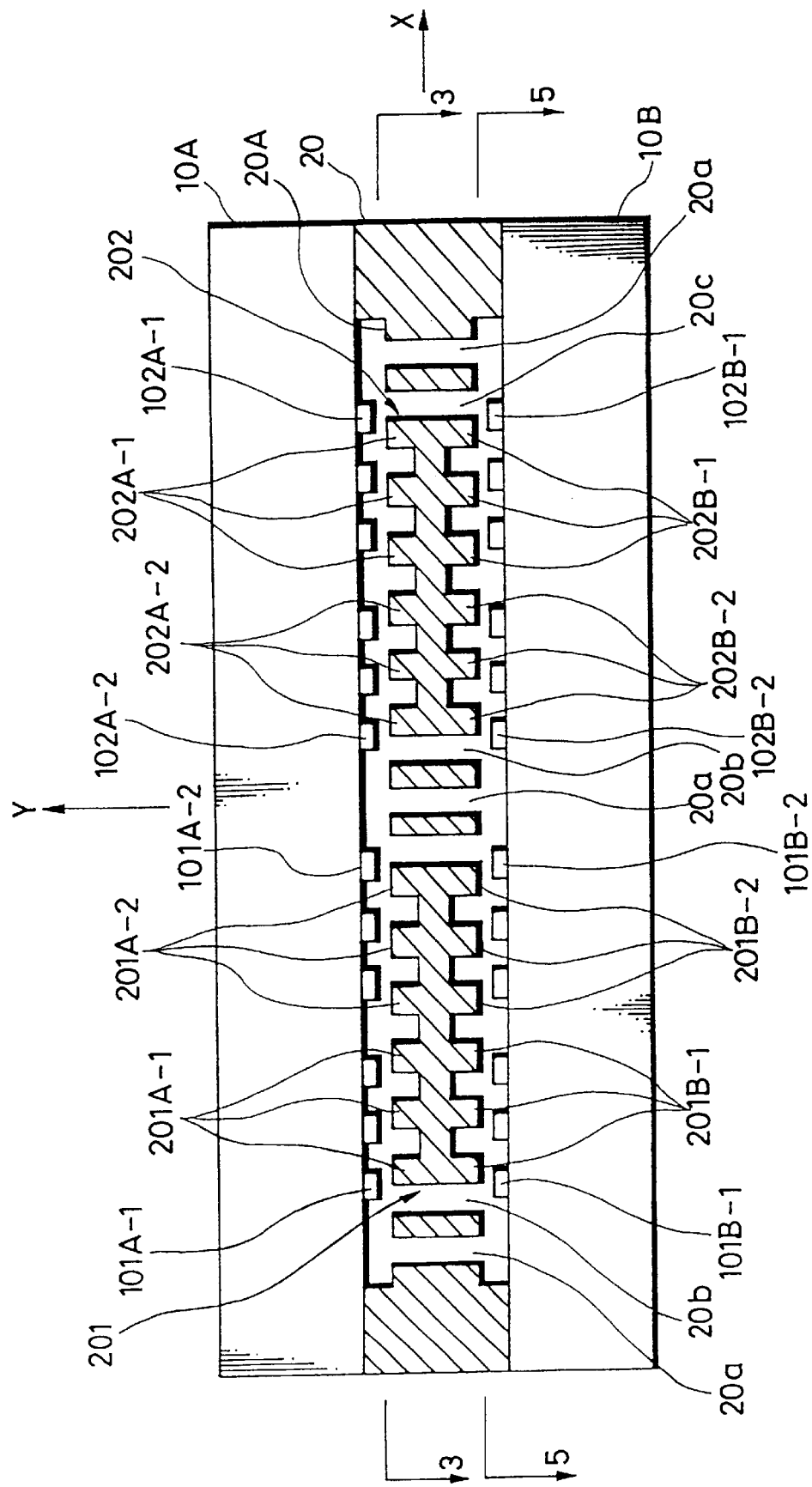
FIG. 4 is a sectional view of the present invention taken along line 2—2 in FIG. 3.

As shown in FIG. 4, the upper surface of vibrational member 201 is provided with elongate electrode sections 201A-1, 201A-2, and the lower surface of vibrational member 201 is provided with elongate electrode sections 201B-1, 201B-2. As shown, the electrode sections 201A-1, 201A-2 and electrode sections 201B-1, 201B-2 are arranged in parallel with the center axis O—O and symmetrically with respect to each other on the two sides of the central axial plane.

Vibrational member 202 of tuning fork portion 202 has a similar structure. Specifically, the upper surface of vibrational member 202 is provided with elongate electrode sections 202A-1 202A-2, and the lower surface of the vibrational member 202 is provided with elongate electrode sections 202B-1, 202B-2. The electrode sections 202A-1, 202A-2 and the electrode sections 202B-1, 202B-2 are arranged in parallel with the center line O—O and symmetrically with respect to each other on the two sides of the central axial plane.

The structure of the cover member 10B will be explained with reference to FIG. 7. The two cover members 10A, 10B have the same structure, and therefore the structure of cover member 10A will not be explained in detail. The inner surface of the cover member 10B is provided with elongate electrodes 101B-1, 101B-2 and 102B-1, 102B-2.

Electrodes 101B-1, 101B-2 are arranged symmetrically with respect to each other on the two sides of the central axial plane O—O as shown, and electrodes 102B-1, 102B-2 are also arranged symmetrically with respect to each other on the two sides of the central axial plane O—O. As shown in FIG. 4, the other cover member 10A has an inner surface thereof provided with electrodes 101A-1, 101A-2 and 102A-1, 102A-2 in similar fashion.

Figure 7:
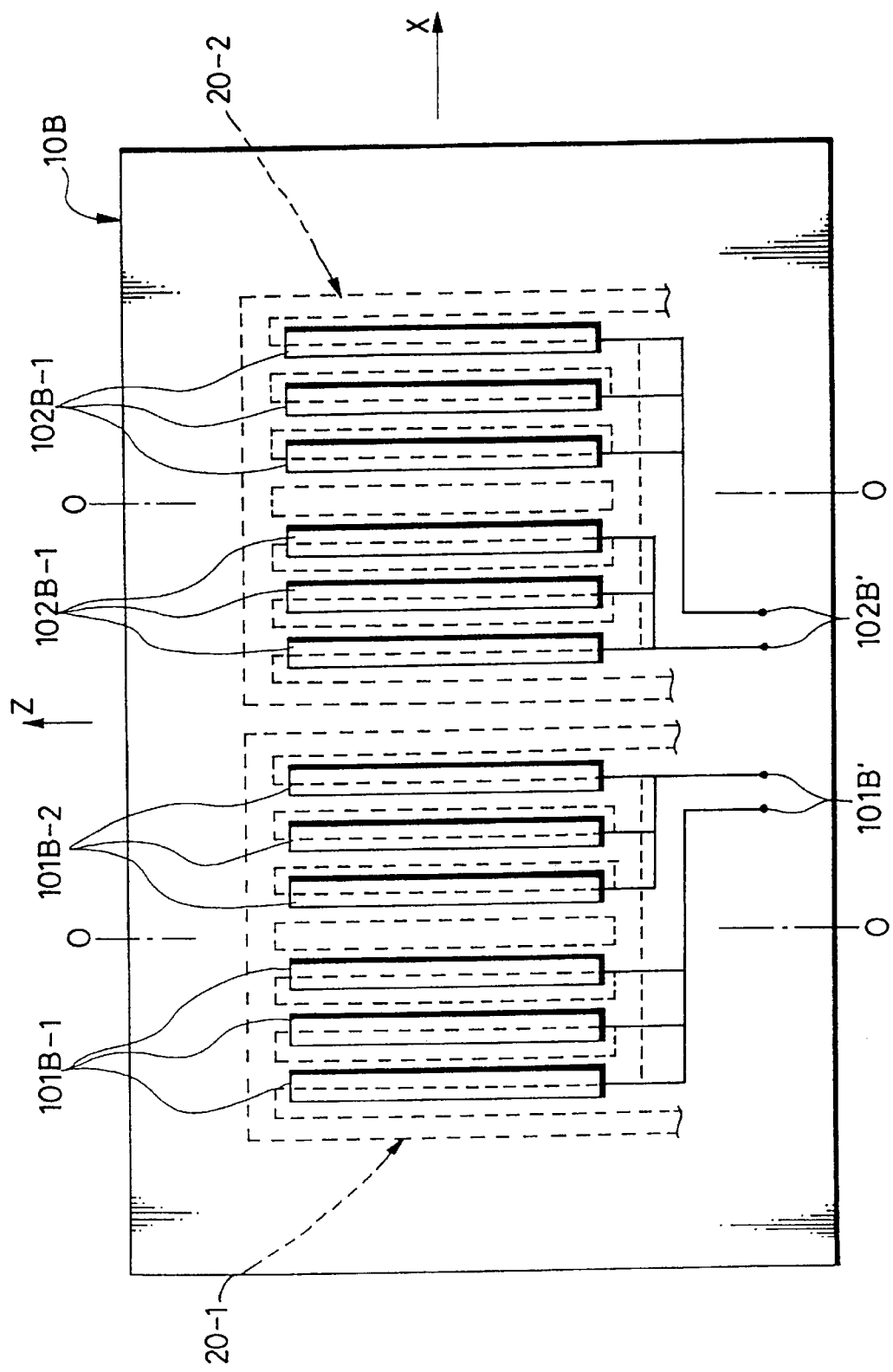
FIG. 7 is a sectional view taken along line 5—5 in FIG. 4 showing a plurality of electrodes formed on the cover members of the vibration-type gyro apparatus.
Figure 8:
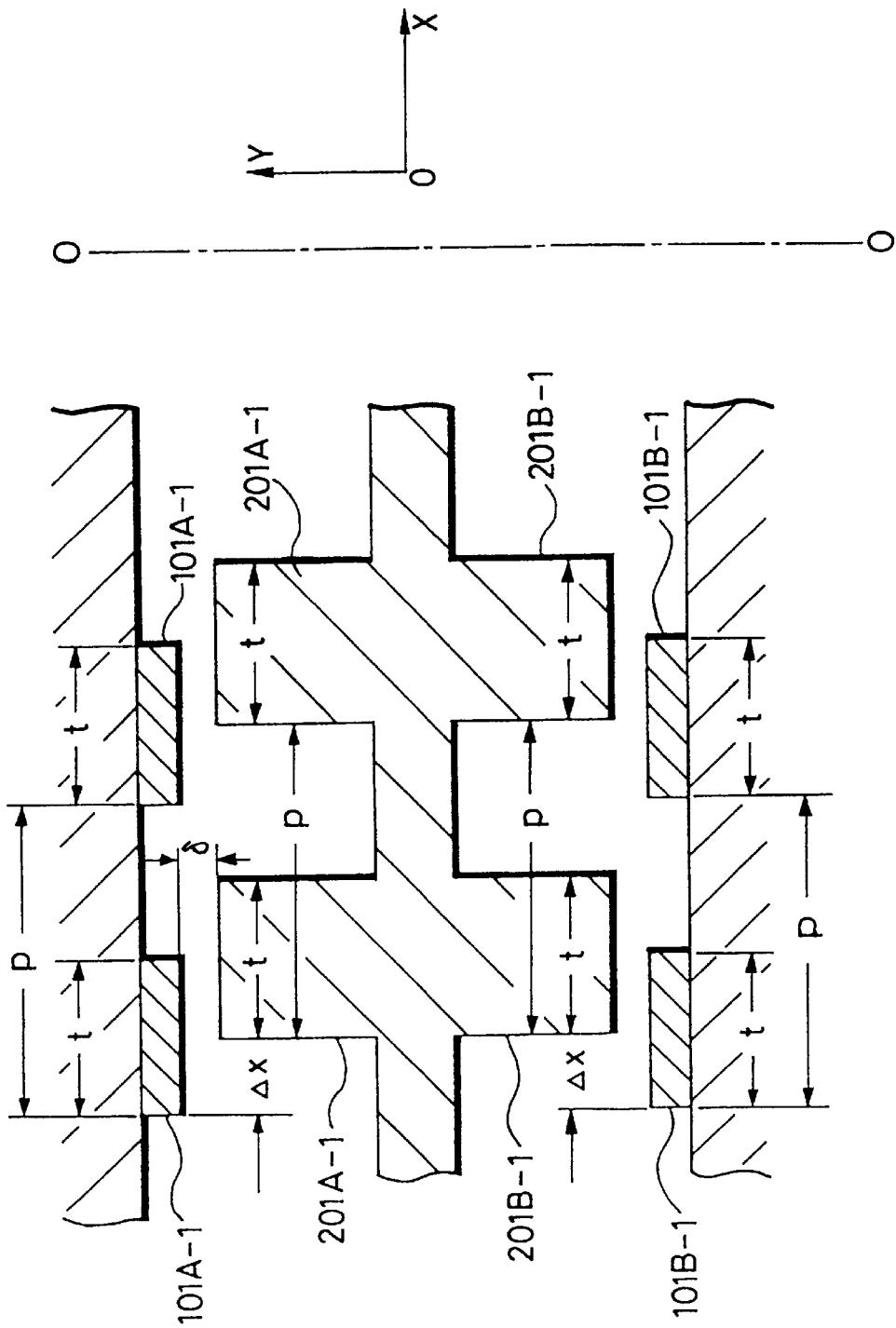
FIG. 8 is a diagram showing the relative positions of the electrodes formed on the cover members and the electrode sections formed on the vibrational members.

As seen in FIGS. 4, 7 and 8, the upper surface of electrode sections 201A-1, 201A-2 of the first tuning fork portion 20-1 correspond to the electrodes 101A-1, 101A-2 arranged on the inner surface of the cover member 10A. The lower surface of electrode sections 201B-1, 201B-2 of the first tuning fork portion 20-1 correspond to the electrodes 101B-1, 101B-2 arranged on the inner surface of the cover member 10B. This positional relation is indicated by the dashed lines in FIG. 7.

As described above, the electrode sections 201A-1, 201A-2 and 201B-1, 201B-2 of the first tuning fork portion are arranged symmetrically with respect to each other on the two sides of the central axial plane O—O, and the electrodes 101A-1, 101A-2 and 101B-1, 101B-2 of the cover members 10A, 10B are arranged symmetrically with respect, to each other on the two sides of the central axial plane.

Consequently, the outer electrode sections 201A-1, 201B-1 of the first tuning fork portion 20-1 correspond to the outer electrodes 101A-1, 101B-1 of the cover members 10A, 10B, respectively. Also, the electrode sections 201A-2, 201B-2 of the first tuning fork portion 20-1 correspond to the electrodes 101A-2, 101B-2 of the cover members 10A, 10B, respectively.

As shown in FIGS. 4 and 7, the electrode sections 201A-2 to 202B-2 of the tuning fork portions 20-1, 20-2 and the electrodes 101A-1 to 102B-2 of the cover members 10A, 10B each have a multiplicity of elongate band-shaped portions, which have the same width and pitch along the X axis.

Each of the band-shaped portions constitutes the electrode sections 201A-1, 201B-1 of the first tuning fork portion 20-1 and each of the band-shaped portions constitutes the electrodes 101A-1, 101B-1 of the cover members 10A, 10B, for example, are arranged with the same pitch with respect to the central axial plane O—O. In similar fashion, each of the band-shaped portions constituting the electrode sections 201A-2, 201B-2 of the first tuning fork portion 20-1 and each of the band-shaped portions making up the electrodes 101A-2, 101B-2 of the cover members 10A, 10B are arranged with the same pitch with respect to the central axial plane O—O.

Electrodes 101A-1, 101A-2, 101B-1, 101B-2 of the cover members 10A, 10B are deviated outwardly from the central axial plane O—O with respect to the corresponding electrode sections 201A-1, 201A-2 and 201B-1, 201B-2 of tuning fork portion 20-1, respectively. In similar fashion, the electrodes 102A-1, 102A-2 102B-1, 102B-2 of the cover members 10A, 10B are deviated outwardly from the central axial plane O—O with respect to the corresponding electrode sections 201A-1, 202A-2 and 202B-1, 202B-2 of the second tuning fork portion 20-2, respectively.

FIG. 8 shows the band-shaped portions making up electrode sections 201A-1, 201B-1 of the tuning fork portion 20-1, and the corresponding band-shaped portions constituting the electrodes 101A-1, 101B-1 of cover members 10A, 10B. The pitch p along the X axis of these band-shaped portions is twice as large as the width t along the X axis of the band-shaped portions, i.e., p=2t. Also, the deviation $\Delta x$ along the X axis of electrodes 101A-1, 101B-1 of the cover members 10A, 10B with respect to electrode sections 201A-1, 201B-1 of the tuning fork portion 20-1 is one half the width t of the band-shaped portions, i.e., $\Delta x = t/2$.

In the example described above, electrodes 101A-1, 101A-2, 101B-1, 101B-2 of the cover members 10A, 10B may alternatively be arranged by being deviated inwardly instead of outwardly from the central axial plane O—O with respect to the corresponding electrode sections 201A-1, 201A-2 and 201B-1, 201B-2 of tuning fork portion 20-1. In such a case, electrodes 102A-1, 102A-2, 102B-1, 102B-2 of the cover members 10A, 10B are arranged also by being deviated inwardly from the central axial plane O—O with respect to the corresponding electrode sections 202A-1, 202A-2 and 202B-1, 202B2 of tuning fork portion 202, respectively.

Figure 9:
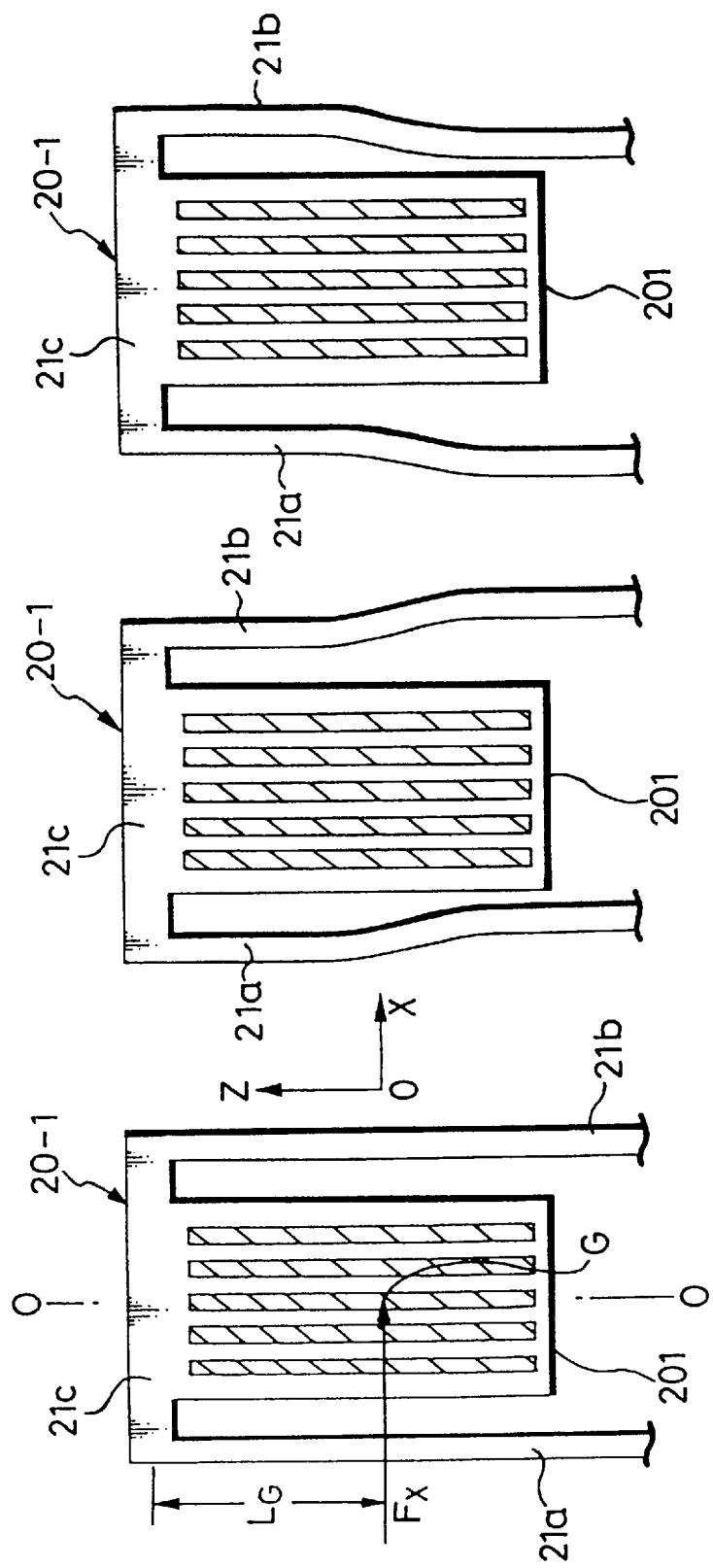
FIGS. 9A to 9C are diagrams showing the deflected support members when the vibrational members of the tuning fork are displaced along the X axis.
Figure 10:
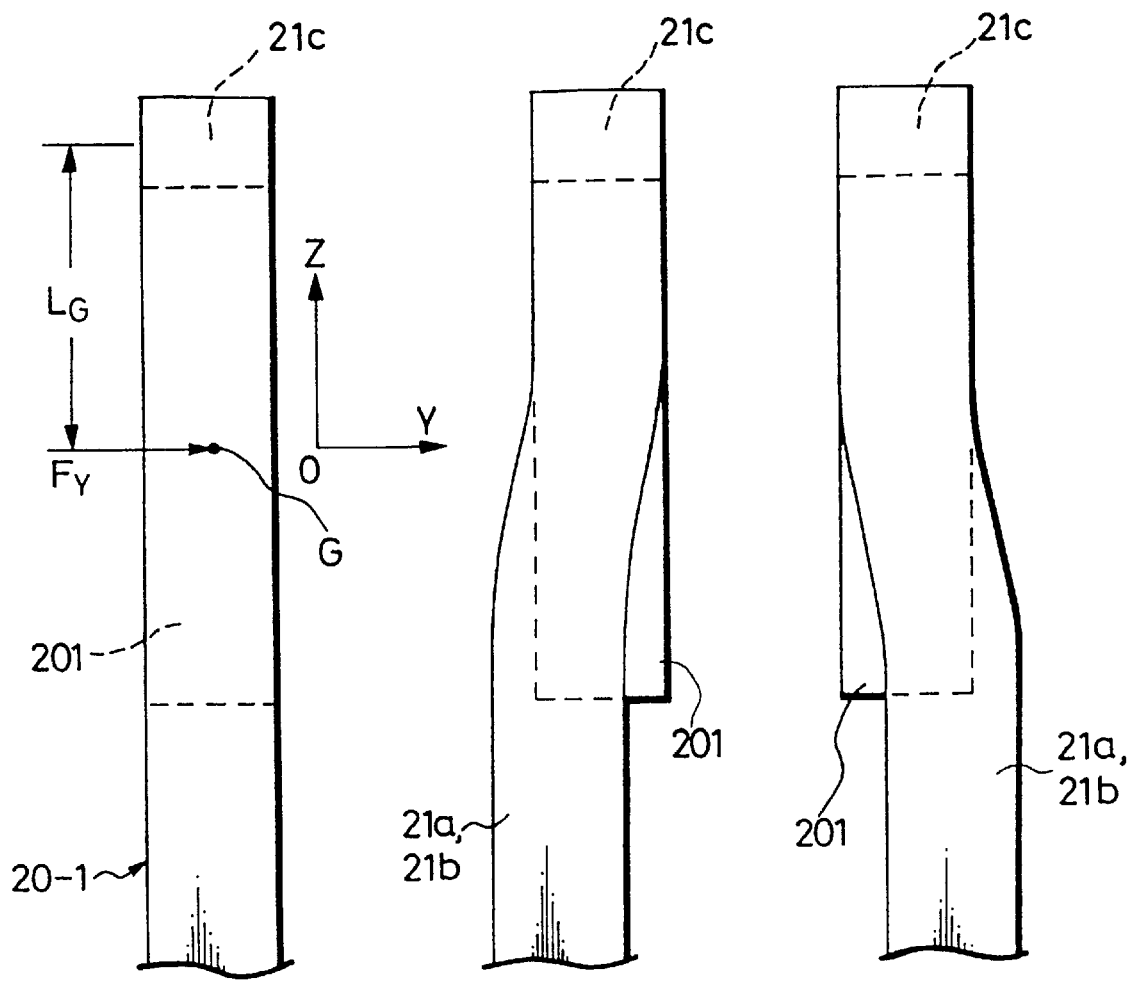
FIGS. 10A to 10C are diagrams showing the deflected support members are deflected when the vibrational members of the tuning fork are displaced along Y axis.

The function of the cantilevered support structure of the tuning fork portion 20-1 will be explained with reference to FIGS. 9 and 10. As explained above, the vibrational member 201 of the tuning fork portion 20-1 is supported in cantilever fashion by the support members 21a, 21b on the two sides of the vibrational section 201. The vibrational member 201 is displaced by the deflection of the support members 21a and 21b. The support members 21a and 21b typically have a rectangular section and are adapted to be deflected in both the XZ plane and the YZ plane. FIG. 9 shows the state in which an external force $F_X$ is exerted on the vibrational member 201 along the X direction so that the support members 21a and 21b are deflected in the XZ plane. FIG. 10 shows the state in which an external force $F_Y$ is exerted on the vibrational member 201 along the Y direction so that the support members 21a and 21b are deflected in the YZ plane.

Reference is made to FIG. 9A. Assume that the center of gravity G of the vibrational member 201 is located at a distance $L_G$ from the forward end of the support members 21a, 21b. When an external force $F_X$ is exerted on the vibrational member 201 along the X direction, the vibrational member 201 is subjected to an angular inoment $F_X \times L_G$ around the rotational axis parallel with the Y axis and passing through the upper end thereof. The support members 21a, 21b, on the other hand, are subjected to a bending moment M around the rotational axis parallel with the Y axis. The angular moment $F_X \times L_G$ and the bending moment M act in opposite directions to each other. In the case where the two moments are equal to each other, therefore, the rotational displacement of the vibrational member 201 around a rotational axis parallel with the Y axis is zero.

Consequently, as shown in FIGS. 9B and 9C, the vibrational member 201 is displaced along the X direction but not rotationally displaced around the rotational axis parallel with the Y axis. In other words, the center axis O—O of the tuning fork portion 201 always remains parallel with the Z axis.

As shown in FIG. 10A, when an external force $F_Y$ is exerted on the vibrational member 201 along the Y direction, the vibrational member 201 is subjected to an angular moment $F_Y \times L_G$ around a rotational axis parallel with the X axis and passing through the upper end of the member. The support members 21a, 21b, on the other hand, are subjected to a bending moment M around the rotational axis parallel with the X axis. The angular moment $F_Y \times L_G$ and the bending moment M act in opposite directions to each other, and therefore, in the case where the two moments are equal to each other, the rotational displacement of the vibrational member 201 around the rotational axis parallel with the X axis is zero.

As a result, as shown in FIGS. 10B and 10C, the vibrational member 201 is displaced along the Y direction but not rotationally displaced around the rotational axis parallel with the X axis. In other words, the center axis O—O of the tuning fork portion 201 always remains parallel with Z axis.

More specifically, as far as the mass and the center of gravity of the vibrational member 201 are appropriately selected, the vibrational member 201 is displaced only linearly outwardly and the center axis O—O is maintained parallel with the Z axis even when the support members 21a, 21b are deflected. The displacement along X axis in FIG. 7 corresponds to the vibratory displacement of the tuning fork portion 20-1, and the displacement along Y axis in FIG. 8 corresponds to the vibratory displacement under the Coriolis force.

According to the present invention, the center axis O—O of the tuning fork portion 20-1 is always parallel with the input axis of tuning fork, i.e, the Z axis. Therefore, the band-shaped portions making up the electrode sections 201A-1 through 201B-2 of the vibrational member 201 and the band-shaped portions making up the corresponding electrodes 101A-1 through 101B-2 of the two cover members 10A and 10B always remain parallel with each other. Therefore, the distance δ between them, is the same at any point along the length of the band-shaped portions. Consequently, the electrostatic attraction is developed most efficiently between the electrodes and the electrode sections.

The function of the vibration-type gyro apparatus according to the present invention will be explained with reference to FIG. 6. The vibration-type gyro apparatus according to the present invention is configured to detect the input angular velocity Ω around the Z axis. The vibrational members 201 and 202 of two tuning fork portions 20-1, 20-2 are vibrated in such a manner as to displace in opposite directions ±V from each other along-the X axis in the XZ plane. Upon exertion of an input angular velocity around the Z axis on the vibration-type gyro apparatus, a Coriolis force $\pm F_C$ is generated along the Y axis in the vibrational members 201, 202 of the tuning fork sections 20-1 and 20-2.

Since the two vibrational members 201 and 202 vibrate in opposite directions to each other, the Coriolis forces $F_C$ exerted on the vibrational members 201 and 202 are also opposite in directions. Consequently, the two Coriolis forces ±F constitute a couple. The Coriolis forces ±F cause the two tuning fork portions 20-1 and 20-2 to alternately vibrate along the Y axis. The input angular velocity Ω can thus be detected by measuring the displacement of this alternate vibrations.

The vibration-type gyro apparatus may have a width and a length of, say, several mm to 10 mm, and a thickness of 5 mm or less.

Figure 5:
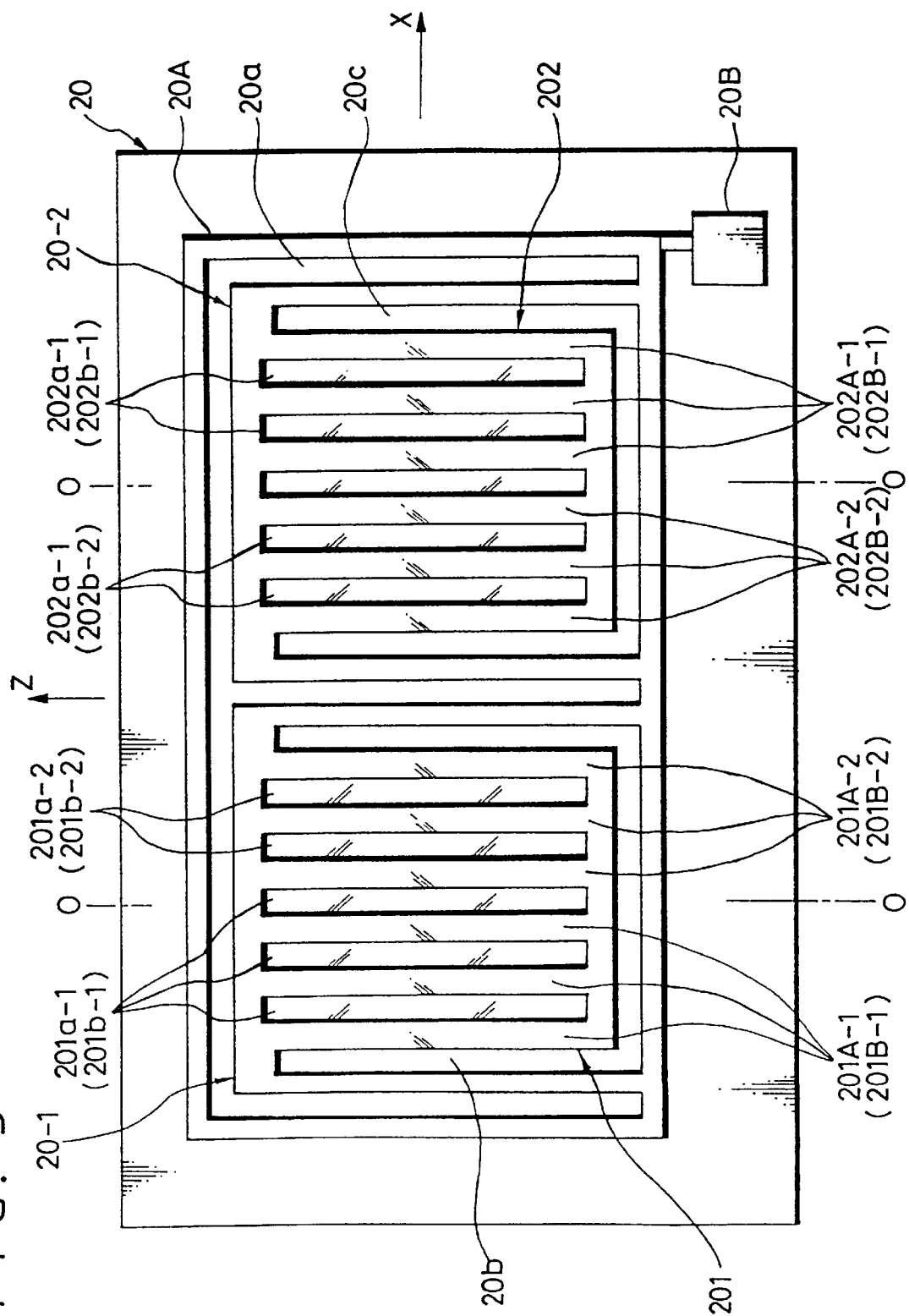
FIG. 5 is a sectional view taken in line 3—3 in FIGS. 3 and 4 showing a base plate and a tuning fork.

As shown in FIGS. 4, 5 and 6, the vibrational members 201 and 202 formed on the base plate 20 may have a longitudinal width and a lateral width of 2 mm to 4 mm and a thickness of 2 to 4 mm. The band-shaped portions making up the electrode sections 201A1, 201A-2, 201B1, 201B2, 202A1, 202A-2, 202B1, 202B2 formed on the vibrational members 201 and 202 may have a width t of 10 μm to 20 μm along X axis.

For example, assume that the width along X axis of the vibrational member 201 of the first tuning fork portion 20-1 is 4 mm, and the width along the X axis of the half portion on the left side of the center axis O—O, i.e., the width along the X axis of the outer electrode 201A-1 is 2.0 mm. In the case where the width t of each of the band-shaped portions making up the electrode 201A-1 is 10 μm, and the pitch p thereof is 20 μm, about 100 band-shaped portions may be included.

In similar fashion, assume that the portion on the right half side of the center axis O—O of the vibrational member 201 of tuning fork portion 20-1, i.e., electrode 201A-2 includes band-shaped portions, each having a width t of 10 μm arranged at a pitch p of 20 μm. Then, about 100 band-shaped portions may be included. The vibrational member 201 of tuning fork portion 20-1 may include a total of about 200 band-shaped portions on the two sides of the center axis O—O.

As shown in FIG. 8, the electrode sections 201A-1, 201A-2, 201B-1, 201B-2, 202A-1, 202A-2, 202B-1, 202B-2 are provided with grooves 201A-1, 201A-2, 201B-1, 201B-2, 202A-1, 202A-2, 202B-1, 202B-2, respectively. The width and pitch of these grooves are equal to the width t and the pitch p of the electrode sections, respectively.

Electrodes 101A-1, 101A-2, 102A-1, 102A-2, 101B-1, 101B-2, 102B-1, 102B-2 formed on the inner surfaces of the cover members 10A and 10B correspond to the electrode sections 201A-1, 201A-2, 201B-1, 201B-2, 202A-1, 202A-

2, 202B-1, 202B-2 of the two tuning fork portions 20-1 and 20-2, respectively, as described above. As a result, as shown in FIG. 8, if the width along the X axis of the lower first electrodes 101B-1, 101B-2 is 2.0 mm and the width t and the pitch p of the band-shaped portions constituting them are 10 µm and 20 µm, respectively, then about 100 band-shaped portions may be included, respectively, for a total of about 200 band-shaped portions.

The thickness of the electrode sections 201A-1, 201A-2, 201B-1, 201B-2, 202A-1, 202A-2, 202B-1, 202B-2 of tuning fork portions 20-1 and 20-2 is determined by the depth of grooves 201a-1, 201a-2 201b-1, 201b-2, 202a-1, 202a-2, 202b-1 and 202b-2, respectively. The depth of these grooves is at least larger than the width t of the band-shaped portions.

Electrodes 101A-1, 101A-2, 102A-1, 102A-2, 101B-1, 101B-2, 102B-1 and 102B-2 of the cover members 10A, 10B are made of a metal thin film, as described later, and may have a thickness of 1 µm or less.

Finally, as shown in FIG. 8, the distance between electrodes 101A-1, 101A-2, 102A-1, 102A-2, 101B-1, 101B-2, 102B-1, 102B-2 of the cover members 10A and 10B corresponding to the electrode sections 201A-1, 201A-2, 201B-1, 201B-2, 202A-1, 202A-2, 202B-1, 202B-2 of the tuning fork portions 201, 202, respectively, that is, the distance δ along the Y axis thereof, is 2 to 3 µm.

Cover members 10A and 10B are constructed from an appropriate insulating material such as glass or a ceramic materials or preferably transparent hard glass. Base plate 20 is constructed from an appropriate conductive material such as metal or preferably single crystal silicon (Si).

Cover members 10A and 10B and the base plate 20 are coupled to each other upon formation thereof. The base plate 20 is sandwiched between the two cover members 10A and 10B. The frame-shaped surface portions around the recesses 20A of the two sides of the base plate 20 are coupled with the inner surfaces of the two cover members 10A and 10B.

By coupling the two cover members 10A and 10B and the base plate 20 to each other in this way, a hermetically closed space is formed between the inner surfaces of the two cover members 10A and 10B. This hermetically closed space is defined by the rectangular shallow recesses 20A formed on the two sides of the base plate 20, E-shaped holes 20a and two U-shaped holes 20b and 20c formed in the bottom of the recesses 20A and the inner surfaces of parallel grooves 201a-1 to 202b-2 formed in the vibrational members 201 and 202.

Vibrational members 201 and 202 of the two tuning fork portions 20-1 and 20-2 vibrate in this hermetically closed space. This hermetically closed space thus is kept in a high vacuum.

As shown in FIG. 5, a recess 20B is preferably formed in the base plate 20. This recess 20B is formed at an appropriate position as to communicate with the hermetically closed space. A getter material for maintaining a high vacuum of the hermetically closed space is disposed in the recess 20B.

The tuning fork portions 20-1, 20-2 may be provided with a stopper for limiting the displacement of the vibrational members 201 and 202. The vibrational members 201 and 202 are adapted to displace basically along the X and Y axes. A stopper is provided, therefore, for limiting the displacement of the vibrational members 201 and 202 in the directions along the X and Y axes.

The electrode sections 201A-1 to 202B-2 of the vibrational members 201 and 202 and the electrodes 101A-1 to 102B-2 of the cover members. 10A and 10B act as capacitors. Electrostatic attraction develops between the capacitors.

This electrostatic attraction is proportional to the capacitance of the capacitors and inversely proportional to the square of the spacing δ. In the case where the spacing δ becomes zero as the electrode sections 201A-1 through 202B-2 of the vibrational members 201 and 202 come into contact with the electrodes 101A-1 through 102B-2 of the cover members 10A and 10B, the electrostatic attraction becomes infinitely large to such an extent that it becomes difficult to separate them from each other. In view of this, a Y stopper may be provided to prevent the electrode sections and the electrodes from approaching each other to such an extent that the space δ between them becomes zero.

The Y stopper may be a thin film of an insulating material provided on at least one electrode selected from electrodes 201A-1 through 202B-2 of vibrational members 201 and 202 and the electrode group 101A-1 through 102B-2 of the cover members 10A and 10B. Silicon oxide ($SiO_2$) may be utilized as the insulating material.

In similar fashion, an X stopper may be provided to limit the displacement of vibrational members 201 and 202 along the X axis. The X stopper may be appropriately formed on the two sides vibrational members 201 and 202, i.e., in the E-shaped hole 20a. As a result, the vibrational members 201 and 202 may be prevented from vibrating with an amplitude larger than a predetermined maximum amplitude level.

Figure 11:
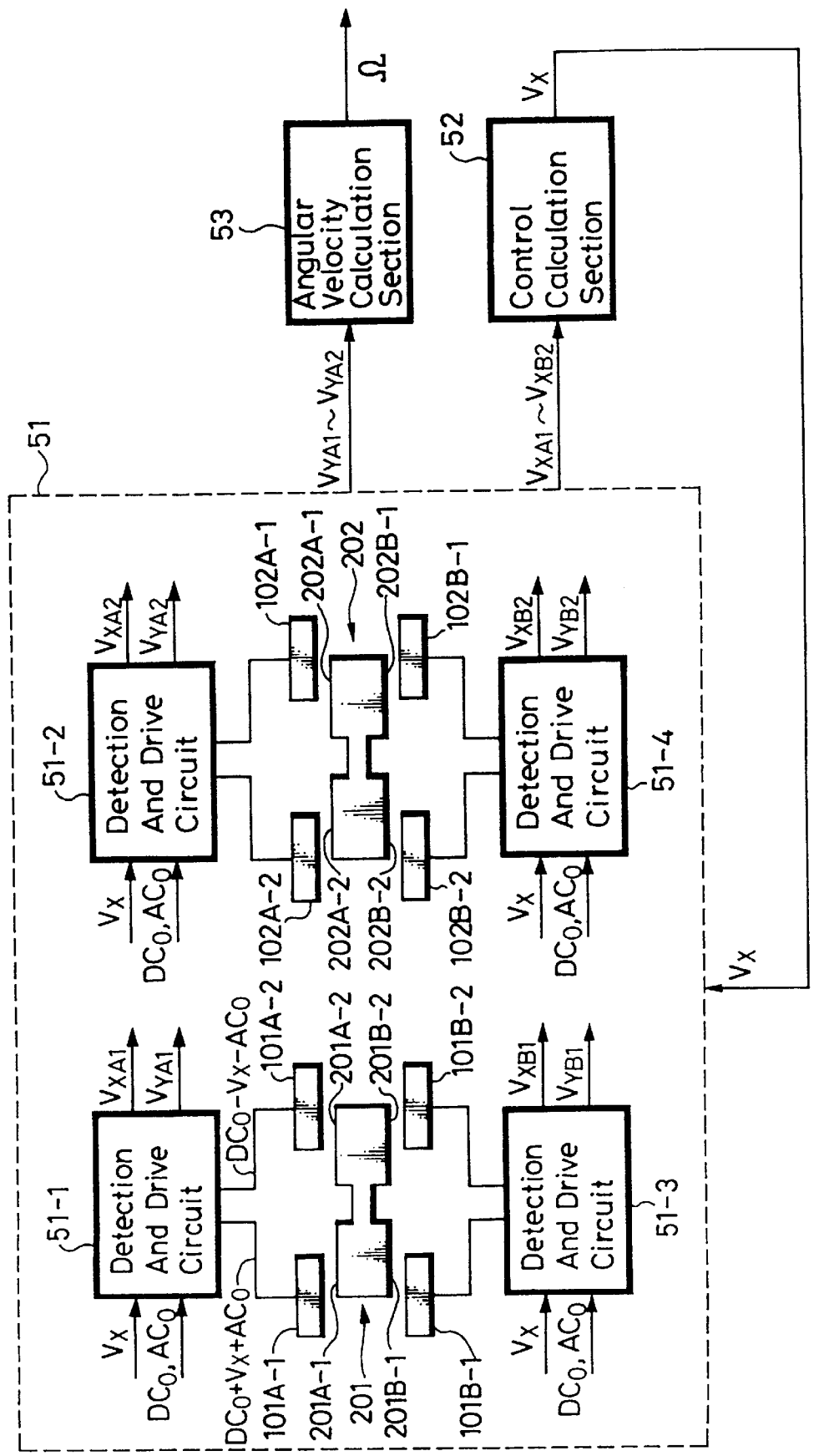
FIG. 11 is a diagram showing an example of a control loop according to the present invention.

A control loop for the vibration-type gyro apparatus will be explained with reference to FIG. 11. The control system for the vibration-type gyro apparatus includes a detection and drive system and an angular velocity detection system. The detection and drive system includes a detection and drive section 51 and a control calculation section 52. The angular velocity detection system, on the other hand, includes the detection and drive section 51 and an angular velocity calculation section 53. The electrodes 101A-1 through 101B-2 and 102A1 through 102B-2 and the corresponding electrode sections 201A-1 to 201B-2 and 202A-1 to 202B-2 actually include a multiplicity of band-shaped portions as described with reference to FIG. 2. For facilitating the understanding, however, only one band-shaped portion is shown in these drawings.

The detection and drive section 51 includes four detection and drive circuits 51-1, 51-2, 51-3, 51-4 connected to the electrodes 101A-1, 101A-2, 102A-1, 101A-2, 101B-1, 101B-2, 102B-1, 102B-2 of the two cover members 10A and 10B.

The first detection and drive circuit 51-1 is connected to electrodes 101A-1 and 101A-2 of cover member 10A, and the second detection and drive circuit 51-2 is connected to electrodes 102A-1, 102A-2 of cover member 10A. The third detection and drive circuit 51-3 is connected to electrodes 101B-1 and 101B-2 of cover member 10B, and the fourth detection and drive circuit 51-4 is connected to electrodes 102B-1 and 102B-2 of cover member 10B.

The first detection and drive circuit 51-1 is supplied with a reference DC voltage $DC_O$, a drive AC voltage $V_X$ and a displacement detection AC voltage $AC_O$ and applies control voltages $DC_O+V_X+AC_O$ and $DC_O-V_X-AC_O$ to electrodes 101A-1 and 101A-2, respectively. The displacement detection AC voltage $AC_O$ is a high-frequency AC voltage. The frequency $f_X$ of the drive AC voltage $V_X$ may be several kHz, and the frequency $f_O$ of the displacement detection AC voltage $AC_O$ may be several hundred kHz to several tenths of a MHz.

The first detection and drive circuit 51-1 produces an X voltage signal $V_{XA1}$ for indicating the displacement along the X axis and a Y voltage signal $Y_{YA1}$ for indicating the displacement along the Y axis of vibrational member 201 of tuning fork portion 20-1. This is also the case with the second, third and fourth detection and drive circuits 51-2, 51-3 and 51-4. The control calculation section 52 calculates the drive AC voltage signal $V_X$ in response to the X voltage signals $V_{XA-1}$, $V_{XA-2}$, $V_{XB-1}$, $V_{XB-2}$ applied thereto. The angular velocity calculation section 53 calculates the input angular velocity $\Omega$ in response to the Y voltage signals $V_{YA-1}$, $V_{YA-2}$, $V_{YB-1}$, $V_{YB-2}$ applied thereto.

Figure 12:
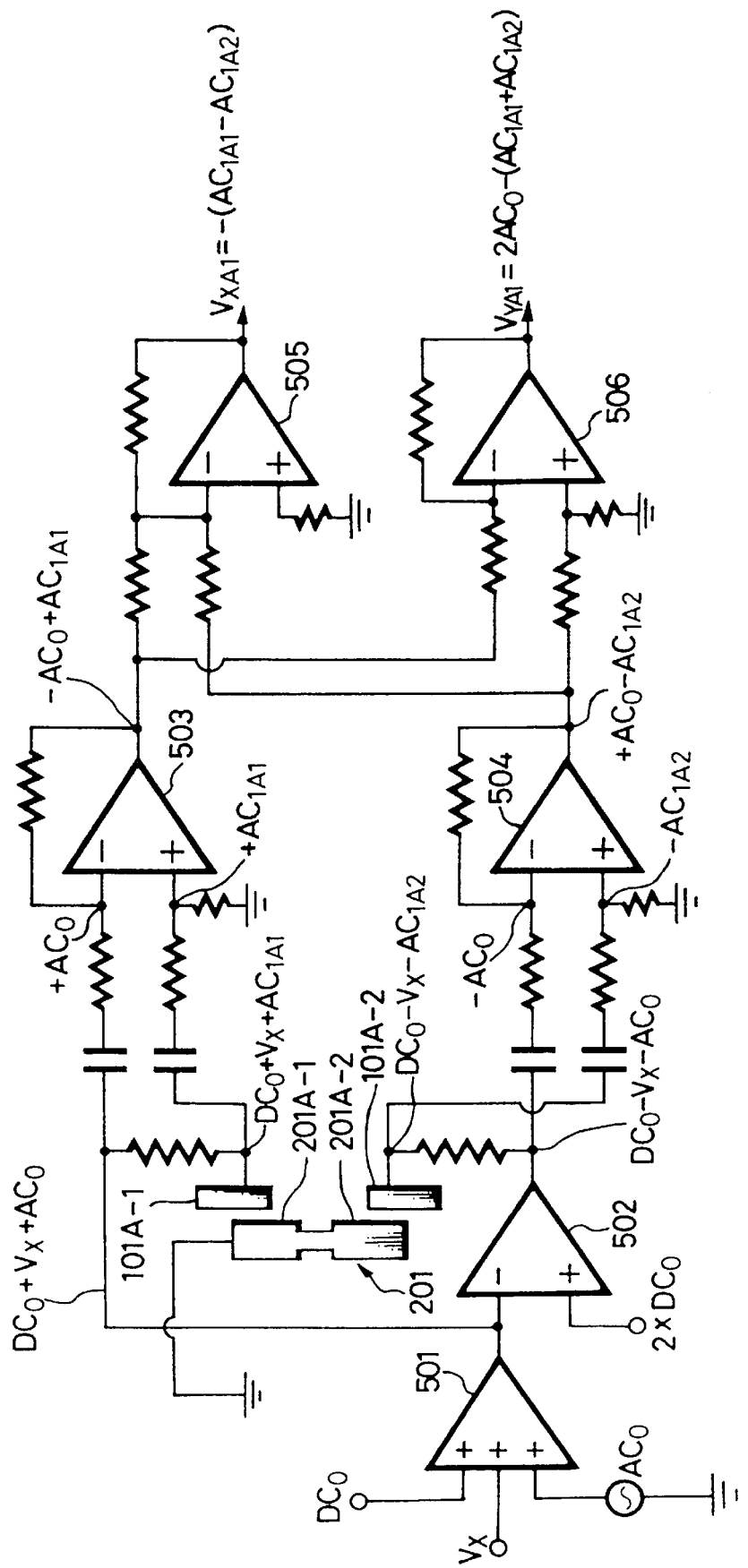
FIG. 12 is a circuit diagram showing an example of a detection and drive circuit according to the present invention.

As seen in FIG. 12, the second, third and fourth detection and drive circuits 51-2, 51-3 and 51-4 have a similar configuration and operate in similar fashion and, therefore, are not described in detail. As shown, the detection and drive circuit 51-1 includes six operational amplifier circuits 501, 502, 503, 504, 505 and 506.

Operational amplifier circuit 501 adds the reference DC voltage $DC_O$, the displacement AC voltage $V_X$ and the displacement detection AC voltage $AC_O$ to generate a first control voltage $DC_O+V_X+AC_O$. Operational amplifier circuit 502 calculates the difference between the output voltage $DC_O+V_X+AC_O$ of operational amplifier circuit 501 and the reference DC voltage $2 \times DC_O$, thereby producing a second control voltage $DC_O-V_X-AC_O$.

These two control voltages $DC_O+V_X+AC_O$, $DC_O-V_X-AC_O$ are applied respectively to electrodes 101A-1 and 101A-2 of cover member 10A.

A capacitor is formed between each of electrodes 101A-1 and 101A-2 of cover member 10A and the corresponding electrode sections 201A-1 and 201A-2 of vibrational member 201. With the displacement of vibrational member 201, the spacing between the electrode sections 201A-1 and 201A-2 and the electrodes 101A-1 and 101A-2 is changed, thereby altering the capacitance of the capacitors. As shown, vibrational member 201 is assumed to be grounded.

The change in the capacitance of the capacitors causes a change in the displacement detection AC component $AC_O$ of the control voltages $DC_O+V_X+AC_O$ and $DC_O-V_X-AC_O$ applied to electrodes 101A-1 and 101A-2. Assuming that the displacement detection AC components after the change are $AC_{1A1}$ and $AC_{1A2}$, respectively, the control voltages applied to electrodes 101A-1 and 101A-2 are $DC_O+V_X+AC_{1A1}$ and $DC_O-V_X-AC_{1A2}$, respectively.

The third operational amplifier circuit 503 is supplied with the output voltage $DC_O+V_X+AC_O$ of operational amplifier circuit 501 and the control voltage $DC_O+V_X+AC_{1A1}$ of electrode 101A-1 through a CR circuit. The CR circuit functions as a filter for removing the reference DC voltage and the drive AC voltage component $DC_O+V_X$. As a result, the third operational amplifier circuit 503 is supplied only with the displacement detection AC voltages $+AC_O$ and $+AC_{1A1}$.

In similar fashion, operational amplifier circuit 504 is supplied with the output voltage $DC_O-V_X-AC_O$ of operational amplifier circuit 502 and the control voltage $DC_O-V_X-AC_{1A-2}$ of the electrode 101A-2 through a CR circuit. The CR circuit removes the reference DC voltage and the drive AC voltage component $DC_O-V_X$. Consequently, the fourth operational amplifier circuit 504 is supplied only with the displacement detection AC voltages $-AC_O$ and $-AC_{1A2}$.

As described above, a high-frequency AC voltage is used as the displacement detection AC voltage $AC_O$. In the case where the frequency $f_X$ of the drive AC voltage $V_X$ is several kHz, the frequency $f_O$ of the displacement detection AC voltage AC is several hundred kHz to several tenths of a MHz. If the frequency $f_O$ of the displacement detection AC voltage $AC_O$ is on the same order of magnitude as the frequency $f_X$ of the drive voltage $V_X$, then it is difficult to remove only the reference DC voltage and the displacement AC voltage components $DC_O \pm V_X$ by the CR circuit. Also, the higher the frequency $f_O$ of the displacement detection AC voltage $AC_O$, the larger the change of the displacement detection AC voltage $AC_O$ with the change of the capacitance of the capacitor, thereby facilitating the detection of a displacement.

The output voltages of operational amplifier circuits 503 and 504 are $-AC_O+AC_{1A1}$ and $+AC_O-AC_{1A2}$, respectively. Operational amplifier circuits 505 and 506 perform the operations of addition and subtraction, respectively, between the output voltages $-AC_O+AC_{1A1}$ and $+AC_O-AC_{1A2}$ of operational amplifiers 503 and 504. Consequently, the output voltages $V_{XA1}$, $V_{YA1}$ of operational amplifiers 505 and 506 are expressed as follows, respectively:

$$V_{XA1}=-(AC_{1A1}-AC_{1A2})$$
$$V_{YA1}=2AC_O-(AC_{1A1}+AC_{1A2}) \quad [1]$$

where $AC_O$ is the displacement detection reference AC voltage, and $AC_{1A1}$ and $AC_{1A2}$ are the displacement detection AC voltage components contained in the control voltages applied to electrodes 101A-1 and 101A-2, respectively.

In similar fashion, the output voltages $V_{XA2}$, $V_{YA2}$, $V_{XB1}$, $V_{XB2}$, $V_{YB2}$ of detection and drive circuits 51-2, 51-3 and 51-4 are given respectively as:

$$V_{XA2}=-(AC_{2A1}-AC_{2A2})$$
$$V_{YA2}=2AC_O-(AC_{2A1}+AC_{2A2})$$
$$V_{XB1}=-(AC_{1B1}-AC_{1B2})$$
$$V_{YB1}=2AC_O-(AC_{1B1}+AC_{1B2})$$
$$V_{XB2}=-(AC_{2B1}-AC_{2B2})$$
$$V_{YB2}=2AC_O-(AC_{2B1}+AC_{2B2}) \quad [2]$$

$AC_{2A1}$, and $AC_{2A2}$ are the displacement detection AC voltage components contained in the control voltages applied to electrodes 102A-1 and 102A-2 of cover member 10A. Also, $AC_{1B1}$ and $AC_{1B2}$ are the displacement detection AC voltage components contained in the control voltages applied to electrodes 101B-1 and 101B-2 of cover member 10B. $AC_{2B1}$ and $AC_{2B2}$ are the displacement detection AC voltage components contained in the control voltages applied to electrodes 102B-1 and 102B-2 cover member 10B.

Figure 1:
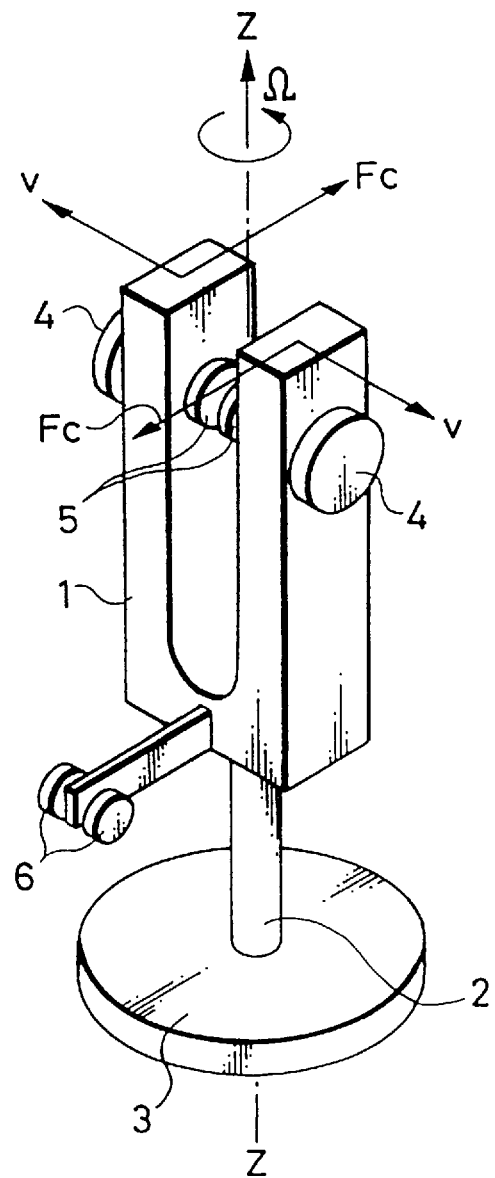
FIG. 1 is a perspective view of a conventional vibration-type gyro apparatus.
Figure 2:
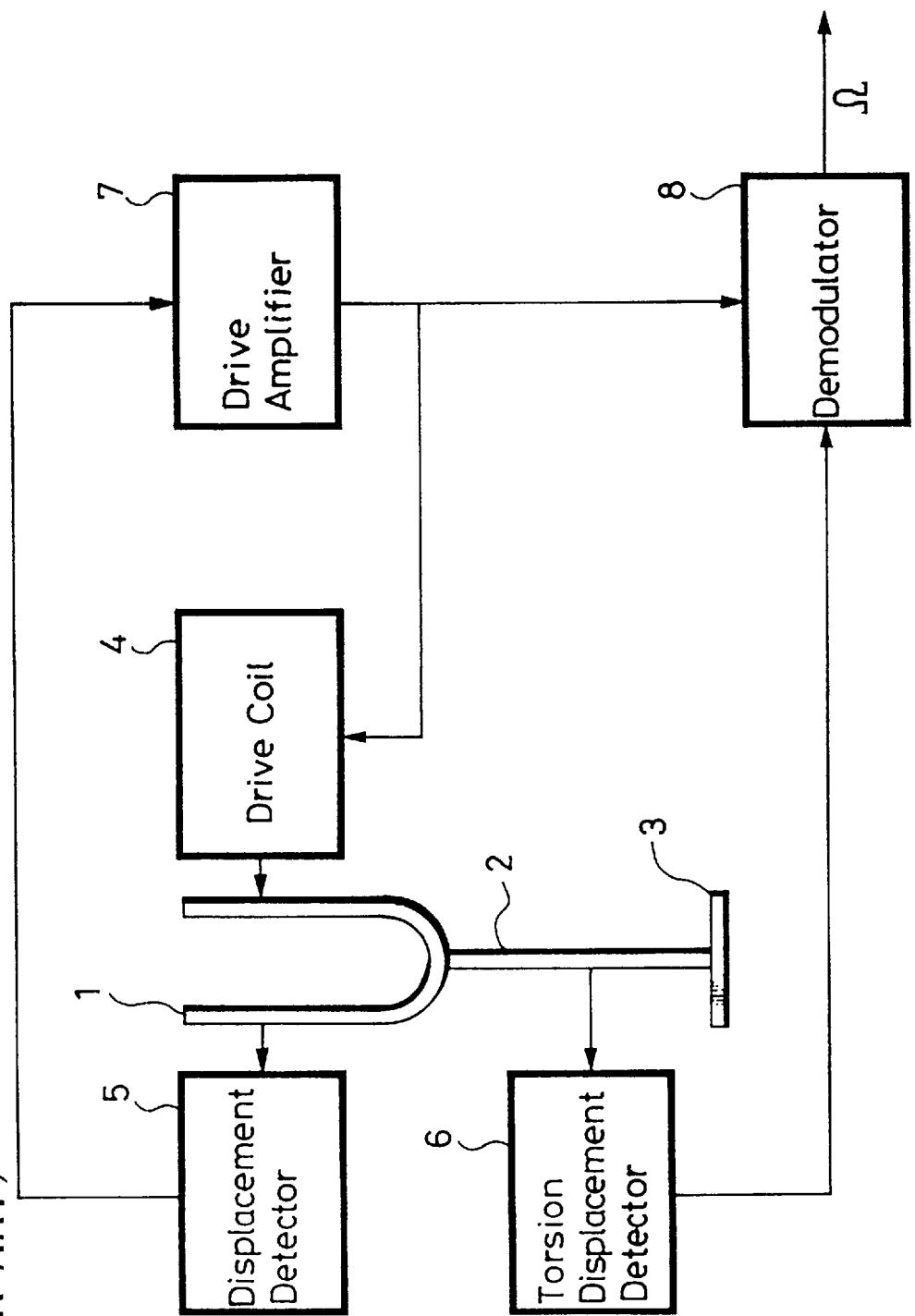
FIG. 2 is a diagram showing an example of a control loop of a conventional vibration-type gyro apparatus.

As seen in FIGS. 13A through 13C, 14A through 14C, 15A through 15C and 16, electrodes 101A-1 through 101B-2 and 102A-1 through 102B-2 and the corresponding electrode sections 201A-1 through 201B-2 and 202A-1 through 202B-2 actually include a multiplicity of band-shaped portions as described with reference to FIG. 2. For facilitating understanding, however, only one band-shaped portion is shown these drawings.

FIGS. 13A through 13C show vibrational members 201 and 202 of tuning fork portions 20-1 and 20-2 vibrating along the X axis in the XZ plane. FIG. 13A shows vibrational members 201 and 202 in spaced relationship with each other. FIG. 13B shows vibrational members 201 and 202 in a neutral position, and FIG. 13C shows vibrational members 201 and 202 located in close proximity to each other.

FIGS. 14A through 14C show vibrational members 201 and 202 of tuning fork portions 20-1 and 20-2 vibrating along the Y axis in the XY plane under the Coriolis force. FIG. 14A shows vibrational member 201 displaced in a negative direction along the Y axis and vibrational member 202 displaced in a positive direction along the Y axis. FIG. 14B shows the state in which the two vibrational members 201 and 202 are in a neutral position. FIG. 14C shows vibrational member 201 displaced in a positive direction along the Y axis and vibrational member 202 is vibrating in a negative direction along the Y axis.

FIGS. 15A through 15C show vibrational members 201 and 202 of tuning fork portions 20-1 and 20-2 displaced along the Y axis in the XY plane due to the acceleration along the Y axis. FIG. 15A shows vibrational members 201 and 202 displaced in positive direction along the Y axis. FIG. 15B shows vibrational members 201 and 202 in a neutral position. FIG. 15C shows vibrational members 201 and 202 displaced in a negative direction the along the Y axis.

As previously mentioned, a capacitor is formed between each of electrodes 101A-1 through 101B-2 and 102A-1 through 102B-2 and the corresponding electrode sections 201A-1 through 201B-2 and 202A-1 through 202B-2. Upon displacement of vibrational members 202 and 102, the relative positions of each electrode and the corresponding electrode section undergo a change, thereby altering the electrostatic capacitance of the associated capacitor.

The electrostatic capacitance of the capacitors formed between electrodes 101A-1 to 101B-2 and 102A-1 to 102B-2 and the corresponding electrode sections 201A-1 through 201B-2 and 202A-1 through 202B-2 are designated as $C_{1A1}$ through $C_{1B1}$ and $C_{2A1}$ through $C_{2B1}$, respectively.

With the increase or decrease in the spacing between electrodes and the corresponding electrode sections, the electrostatic capacitance $C_{1A1}$ through $C_{1B1}$ and $C_{2A1}$ through $C_{2B2}$ of the capacitors formed by them decrease or increase, respectively. Likewise, voltages $AC_{1A1}$ through $AC_{1B1}$ and $AC_{2A1}$ through $AC_{2B2}$ applied between the electrodes and the electrode sections increase or decrease, respectively.

With the decrease or increase of the area where the electrodes 101A-1 through 101B-2 and 102A-1 through 102B-2 are substantially superimposed on the electrode sections 201A-1 through 201B-2 and 202A-1 through 202B-2, respectively, the electrostatic capacitances $C_{1A1}$ through $C_{1B1}$ and $C_{2A1}$ through $C_{2B2}$ of the capacitors formed by them decrease or increase, respectively, so that the voltages $AC_{1A1}$ through $C_{1B1}$ and $AC_{2A1}$ through $AC_{2B2}$ applied between them increase or decrease, respectively.

FIGS. 16, 13A, 14A and 15A show changes of the electrostatic capacitances $C_{1A1}$ through $C_{1B1}$ and $C_{2A1}$ through $C_{2B2}$ of the capacitors and the displacement detection AC voltage components $AC_{1A1}$ through $AC_{1B1}$ and $AC_{2A1}$ through $AC_{2B2}$ applied to the capacitors The upper capacitors of vibrational member 201 are designated by reference numerals 1A1 and 1A2 and the lower capacitors thereof by reference numerals 1B1 and 1B2, respectively. Also, the upper capacitors of vibrational member 202 are designated by reference numerals 2A1 and 2A2 and the lower capacitors by reference numerals 2B1 and 2B2.

In FIG. 16, an increase in the electrostatic capacitances $C_{1A1}$ through $C_{1B1}$ and $C_{2A1}$ through $C_{2B2}$ of the capacitors is expressed by "I", and a decrease thereof by "R", while an increase in the displacement detection AC voltage components $AC_{1A1}$ through $AC_{1B1}$ and $AC_{2A1}$ through $AC_{2B2}$ by "+" and the decrease by "−".

As shown in FIG. 13A and 16, during vibration of the tuning fork, the spacing of the upper outer capacitor 1A1 in the first vibrational member 201 remains unchanged while the effective area thereof increases. Consequently, the electrostatic capacitance $C_{1A1}$ increases (I) while the displacement detection AC voltage component $AC_{1A1}$ decreases. (−). The spacing of the inner capacitor 1A2 remains unchanged while the effective area thereof decreases. As a result, the electrostatic capacitance $C_{1A2}$ decreases (R), while the displacement detection AC voltage component $AC_{1A2}$ increases (+).

The electrostatic capacitances $C_{1B1}$ and $C_{1B2}$ of the lower capacitors 1B1, 1B2 and the displacement detection AC voltage components $AC_{1B1}$ and $AC_{1B2}$ change in a similar manner to the electrostatic capacitances $C_{1A1}$ and $C_{1A2}$ of the upper capacitors 1A1, 1A2, 1B1, 1B2 of vibrational member 201.

As shown in FIG. 14A and 16, during vibration under the Coriolis force, the effective area of the two upper capacitors 1A1, 1A2 of vibrational member 201 remains unchanged while the spacing between them increases. Consequently, the electrostatic capacitances $C_{1A1}$ and $C_{1A2}$ decrease (R), while the displacement detection AC voltage components $AC_{1A1}$ and $AC_{1A2}$ increase (+). Conversely, the effective area of the two lower capacitors 1B1 and 1B2 remains unchanged while the spacing therebetween decreases. Consequently, the electrostatic capacitances $C_{1B1}$ and $C_{1B2}$ increase (I), while the displacement detection AC voltage components $AC_{1B1}$ and $AC_{1B2}$ decrease (−). The capacitors 2A1, 2A2, 2B1, 2B2 of vibrational member 202 operate in the opposite manner of capacitors 1A1, 1A2, 1B1, 1B2 of vibrational member 201.

As shown in FIGS. 15A and 16, during displacement due to acceleration along the Y axis, the effective area of the two upper capacitors 1A1, and 1A2 of vibrational member 201 remains unchanged while the spacing therebetween decreases. As a result, the electrostatic capacitances $C_{1A1}$ and $C_{1A2}$ increase (I), and the displacement detection AC voltage components $AC_{1A1}$ and $AC_{1A2}$ decrease (−). Conversely, the effective area of the two lower capacitors 1B1 and 1B2 remains unchanged while the spacing between them increases. Consequently, the electrostatic capacitances $C_{1B1}$ and $C_{1B2}$ decrease (R), while the displacement detection AC voltage components $AC_{1B1}$ and $AC_{1B2}$ increase (+). The capacitors 2A1, 2A2, 2B1 and 2B2 of vibrational member 202 operate in a similar manner to the capacitors 1A1, 1A2, 1B1 and 1B2 of vibrational member 201.

As described above, tuning fork portions 20-1 and 20-2 have a structure symmetrical about the Z axis. Electrodes 101A-1 through 101B-2 and 102A-1 through 102B-2 also have a structure symmetrical with respect to the electrode sections 201A-1 through 201B-2 and 202A-1 through 202B-2 about the Z axis. Further, in each of the tuning fork portions 20-1 and 20-2, electrodes 101A-1 through 101B-2 and 102A1 through 102B-2 have a structure symmetrical with respect to electrode sections 201A-1 through 201B-2 and 202A-1 through 202B-2, respectively, about the center axis O—O.

As a consequence, both the absolute value of change in the effective area and the absolute value of change in the spacing of each capacitor can be assumed to be the same in all the cases. In other words, the absolute value of change in the electrostatic capacitance of each capacitor is the same and so is the absolute value of change in the displacement detection AC voltage component applied to each capacitor in all the cases. Depending on specific cases, however, the polarity of the change in electrostatic capacitance of each capacitor and the polarity of change in the displacement detection AC voltage component applied to each capacitor may be different.

As shown in FIGS. 13A and 13C, during vibration of the tuning fork, the electrostatic capacitances $C_{1A1}$ and $C_{1B1}$ of the two outer capacitors 1A1, 1B1 and the displacement detection AC voltage components $AC_{1A1}$ and $AC_{1B1}$ of vibrational member 201 of tuning fork portion 20-1 are identical to each other in both the absolute value of change and the polarity. Also, the electrostatic capacitances C1A2 and C1AB of the inner two capacitors 1A2 and 1B2 and the displacement detection AC voltage components $AC_{1A\text{-}2}$ and $AC_{1B\text{-}2}$ are identical to each other in the absolute value of change and polarity.

This is also the case with vibrational member 202 of tuning fork portion 202. Consequently, the following relations hold:

$$C_{1A1}=C_{1B1}=C_{2A1}=C_{2B1}$$

$$AC_{1A1}=AC_{1B1}=AC_{2A1}=AC_{2B1}$$

$$C_{1A2}=C_{1B2}=C_{2A2}=C_{2B2}$$

$$AC_{1A2}=AC_{1B2}=AC_{2A2}=AC_{2B2} \quad [3]$$

As shown in FIGS. 14A and 14C, during vibration under Coriolis force, the electrostatic capacitances $C_{1A1}$ and $C_{1A2}$ of the two upper capacitors 1A1 and 1A2 and the displacement detection AC voltage components $AC_{1A1}$ and $AC_{1A2}$ are identical to each other in terms of absolute value of change and polarity. Also, the electrostatic capacitances $C_{1B1}$ and $C_{1B2}$ of the two lower capacitors 1B1 and 1B2 and those of the displacement detection AC voltage components $AC_{1B1}$ and $AC_{1B2}$, respectively, are identical to each other in terms of absolute value of change and the polarity.

This is also the case with the vibrational member 202 of tuning fork portion 20-2. Also, the two upper capacitors 1A1 and 1A2 of vibrational member 201 operate the same way as the two lower capacitors 2B1 and 2B2 of vibrational member 202. Consequently, the following relations hold:

$$C_{1A1}=C_{1A2}=C_{2B1}=C_{2B2}$$

$$AC_{1A1}=AC_{1A2}=AC_{2B2}=AC_{2B2}$$

$$C_{1B1}=C_{1B2}=C_{2A1}=C_{2A2}$$

$$AC_{1B1}=AC_{1B2}=AC_{2A1}=AC_{2A2} \quad [4]$$

As shown in FIGS. 15A and 15C, during displacement due to acceleration along the Y axis, electrostatic capacitances $C_{1A1}$ and $C_{1A2}$ and $C_{2A1}$ and $C_{2A2}$ of the four upper capacitors 1A1, 1A2, 2A1, and 2A2 and the displacement detection AC voltage components $AC_{1A1}$, $AC_{1A2}$, $AC_{2A1}$ and $AC_{2A2}$, respectively, of vibrational members 201 and 202 are equal to each other in terms of absolute value of change and the polarity. Also, the four lower capacitors 1B1, 1B2, 2B1 and 2B2 and the displacement detection AC voltage components $AC_{1B1}$, $AC_{1B2}$, $AC_{2B1}$ and $AC_{2B2}$, are equal to each other in terms of absolute value of change and the polarity. The following relations thus hold:

$$C_{1A1}=C_{1A2}=C_{2A1}=C_{2A2}$$

$$AC_{1A1}=AC_{1A2}=AC_{2A1}=AC_{2A2}$$

$$C_{1B1}=C_{1B2}=C_{2B2}=C_{2B2}$$

$$AC_{1B1}=AC_{1B2}=AC_{2B1}=AC_{2B2} \quad [5]$$

The configuration and the operation of the control calculation section 52 will be explained with reference to FIGS. 17 and 18A through 18C. The control calculation section 52 includes three adders 52-1, 52-2, 52-3, a demodulator 52-4, a compensator 52-5 and a coefficient multiplier 52-6. The first adder 52-1 calculates the sum $V_{XA1}+V_{XB1}$ of two X voltage $V_{XA1}$ and $V_{XB1}$, and the second adder 52-2 calculates the sum $V_{XA2}+V_{XB2}$ of two X voltage signals $V_{XA2}$ and $V_{XB2}$. The third adder 52-3 calculates the sum of the output signals of the two adders 52-1 and 52-2. The output signal $V_{XO}*AC$ of the third adder 52-3 is given as $$V_{XO}*AC=V_{XA1}+V_{XB1}+V_{XA2}+V_{XB2} \quad [6]$$

Substituting Formulae 1 and 2 into Formula 6, $$V_{XO}*AC=-(AC_{1A1}-AC_{1A2})-(AC_{2A1}-AC_{2A2})-(AC_{1B1}-AC_{1B2})-(AC_{2B1}-AC_{2B2}) \quad [7]$$

In the case of the vibration of the tuning fork, the output signal $V_{XO}*AC$ can be determined by substituting Formula 3 into Formula 7 as follows:

$$V_{XO}*AC=-4(AC_{1A1}-AC_{1A2}) \quad [8]$$

In the case of vibration under the Coriolis force and in the case of displacement due to acceleration in the direction of the Y axis, on the other hand, the output signal $V_{XO}*AC$ is determined as zero by substituting Formulae 4 and 5 into Formula 7. In other words, the output signal $V_{XO}*AC$ of the third adder 52-3 is not affected by any vibration due to Coriolis force or any acceleration along the Y axis which may occur.

According to this embodiment, as described above, once vibrational members 201, 202 of the tuning fork are displaced along the X axis due to vibration of the tuning fork, the output voltage $V_{XO}*AC$ shown in Formula 8 is equal to the output by the third adder 52-3 of the control calculation section 52.

This output voltage $V_{XO}$ is the difference between the voltage $AC_{1A1}$ applied to capacitor 1A1 and the voltage $AC_{1A2}$ applied to capacitor 1A2. This obviously indicates the vibratory displacement Δx in the direction along the X axis of vibrational members 201 and 202 of the tuning fork.

The output signal $V_{XO}*AC$ of the third adder 52-3 generally assumes the following form, and FIG. 18A shows a waveform thereof:

$$V_{XO}*AC-K_X\cdot\sin(2_\pi f_X T)\times\sin(2_\pi F_O t) \quad [9]$$

where $f_X$ is the frequency of the drive AC voltage signal of, say, several kHz, and $f_O$ is the frequency of the displacement detection AC voltage of, say, several hundred kHz to several tens of MHz.

In FIG. 18A, the amplitude of the envelope (indicated by dashed line) of the curve representing the waveform of output signal $V_{XO}*AC$ is proportional to the vibratory displacement ΔX along the X axis of vibrational members 201 and 202 and corresponds to the coefficient $K_X$ in Formula 9. The coefficient $K_X$, therefore, is given as:

$$K_X = k_X \Delta X \quad [10]$$

where $k_X$ is a proportionality constant.

The output signal $V_{XO}{}^*AC$ of adder 52-3 is applied to demodulator 52-4, where it is synchronously detected by the signal of reference frequency $f_O$. The output signal $V_{XO}$ of the demodulator 52-4 generally assumes the following form, of which the waveform is shown in FIG. 18B:

$$V_{XO} = K_1 K_X \cdot \sin(2\pi f_X t) \quad [11]$$

where K is a proportionality constant.

The output signal $V_{XO}$ of demodulator 52-4 is applied to compensator 52-5. The compensator 52-5 functions to adjust the phase and the amplitude $K_1 K_X$ of the displacement voltage signal $V_{XO}$. The coefficient multiplier 52-6 adjusts the gain of the compensator 52-5 in such a manner that the amplitude $K_1 K_X$ of the displacement voltage signal $V_{XO}$ assumes a predetermined constant value. In other words, the amplitude ΔX of the tuning fork is controlled to a constant value.

The output signal of the compensator 52-5, i.e., the output signal $V_X$ of the control calculation section 52 is generally given as:

$$V_X = K_2 K_1 K_X \cdot \sin(2\pi f_X t \, \phi) \quad [12]$$

where $K_2$ is a coefficient supplied from the coefficient multiplier 52-6 and undergoes such a change that the amplitude $K_1 K_X$ of the displacement voltage signal $V_{XO}$ assumes a constant value. Also, $\phi$ is the phase applied by the compensator 52-5. The tuning fork is self-oscillated by appropriately selecting the value of the phase $\phi$.

Generally, the electrostatic attraction F that works between two parallel electrodes is expressed by the following formula:

$$F = \epsilon V^2 S / {}^2\delta^2 = CV^2/2\delta \quad [13]$$

where $\epsilon$ is a dielectric constant, V is the voltage applied between the electrodes, S is the area of the electrode, $\delta$ is the distance between the electrodes, and C is the electrostatic capacitance of the capacitor formed, by the two electrodes.

As shown in FIG. 13B, assume that vibrational members 201, and 202 are located at neutral position. The control voltages applied to the outer electrodes 101A-1 and 101B-1 of vibrational member 201 are considered as $DC_O+V_X$, $DC_O+V_X$, and the control voltages applied to the inner electrodes 101A-2 and 101B-2 as $DC_O-V_X$, $DC_O-V_X$, respectively. Actually, however, the displacement detection AC voltage component $AC_O$ is also applied. However, the frequency $f_O$ of the displacement detection AC voltage component $AC_O$ is considerably different from the resonance frequency of the tuning fork, and thus can be ignored.

Vibrational member 201 exerts an electrostatic attraction $F_{X1}$ in the negative direction (outward) along the X axis, while an electrostatic attraction $F_{X2}$ is exerted in the positive direction (inward) along the X axis. The gap $\delta$ of the capacitor is constant and so is the electrostatic capacitance C of the capacitor. Consequently, the electrostatic attractions $F_{X1}$ and $F_{X2}$ exerted on vibrational member 201 are given as:

$$F_{X1} = (C/2\delta)(DC_O+V_X)^2$$

$$F_{X2} = (C/2\delta)(DC_O-V_X)^2 \quad [14]$$

The resultant of the forces exerted in negative direction (outward) along the X axis on vibrational member 201 of tuning fork portion 20-1 is expressed as:

$$F_x = K_{FX}(F_{X1}-F_{X2}) = K_{FX}(C/2\delta)(DC_O+V_X)^2 - K_{FX}(C/2\delta)(DC_O-V_X)^2 = K_{FX}(C/2\delta) \cdot 4DC_O V_X \quad [15]$$

where $K_{FX}$ is a coefficient attributable to the number of electrodes or the like and is generally proportional to the number of electrodes. $DC_O$ is a reference DC voltage, and $V_X$ is a drive AC voltage, the magnitude and polarity of which change as shown in Formula 12 and FIG. 18C. Thus, each time the polarity of the drive AC voltage $V_X$ changes, the electrostatic attraction exerted along the X axis on vibrational member 201 reverses in direction. In this way, vibrational member 201 vibrates at the same period as the period $f_X$ of the drive AC voltage $V_X$.

With the displacement of vibrational member 201, the electrostatic capacitance C of the capacitor changes, and so does the value of the electrostotic attraction $F_X$. In the case where vibrational member 201, is displaced in the negative direction (outward), for example, the outer electrostatic capacitances $C_{1A1}$ and $C_{1B1}$ of vibrational member 201 increase, while the inner electrostatic capacitances $C_{1A2}$ and $C_{1B2}$ of vibrational member 201 decrease. As a result, the electrostatic attraction $F_{X1}$ increases in the negative direction (outward) along the X axis, while the electrostatic attraction $FX_2$ in the positive direction (inward) decreases. The electrostatic force $F_X$ exerted on vibrational member 201 in the negative direction (outward) along the X axis is increased. As the displacement of vibrational member 201 increases, however, the elastic force of the cantilevered support member of vibrational member 201 increases. The displacement assumes a maximum value when both are balanced.

The drive AC voltage $V_X$ thus is inverted in polarity, the electrostatic force $F_X$ exerted along the X axis on vibrational member 201 reverses in direction, and vibrational member 201 is displaced in the reverse direction, i.e., in the positive direction along the X axis (inward). This process is repeated, thereby vibrating vibrational member 201. This is also the case with the electrostatic force $F_X$ exerted on vibrational member 202 of tuning fork portion 20-2.

Figure 19:
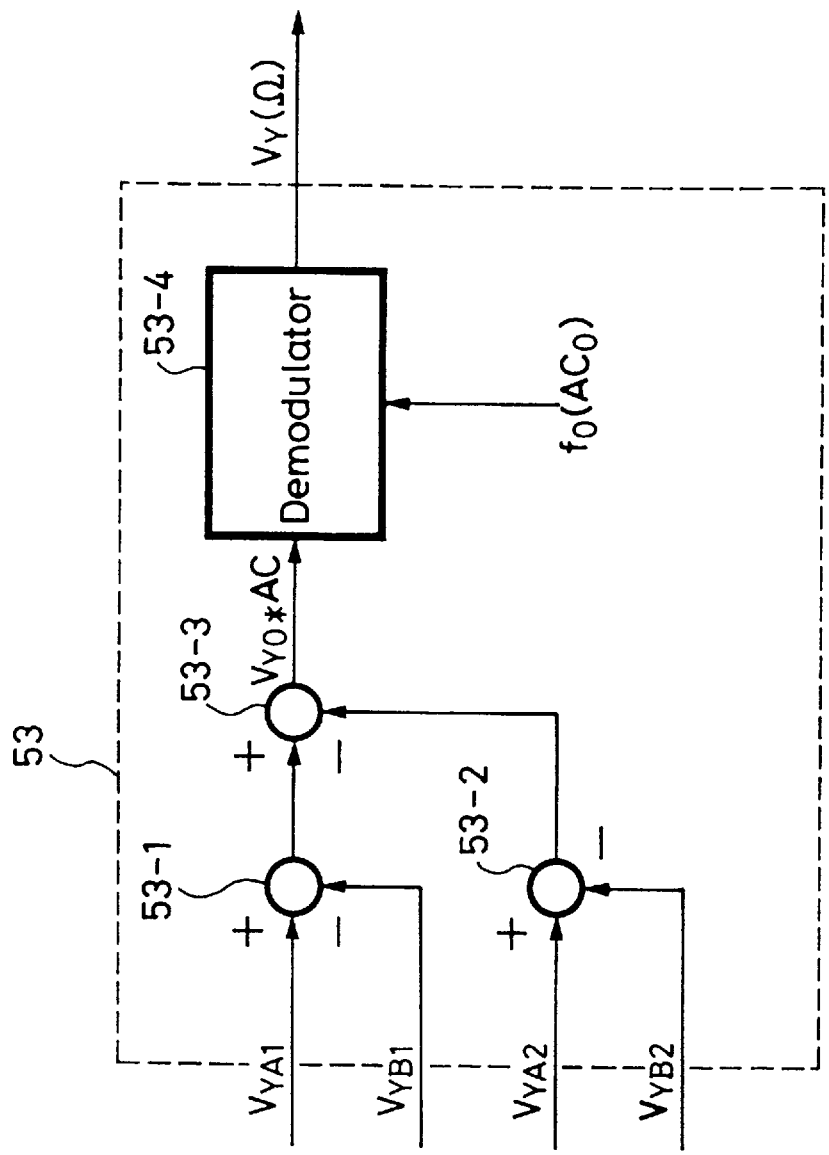
FIG. 19 is a diagram showing an example configuration of an angular velocity calculation section according to the present invention.

As seen in FIG. 19, the angular velocity calculation section 53 includes three adders 53-1, 53-2 and 53-3 and a demodulator 53-4. The first adder 53-1 calculates the difference $V_{YA1}-V_{YB2}$ between two Y voltage signals $V_{YA1}$ and $V_{YB1}$ and the second adder 53-2 calculates the difference $V_{YA2}$ and $V_{YB2}$ between the two Y voltage signals $V_{YA2}$ and $V_{YB2}$. The third adder 53-3 calculates the difference between the output signals of the two adders 53-1 and 53-2. The output signal $V_{YO}{}^*AC$ of the third adder 53-3 is given as:

$$V_{YO}{}^*AC = (V_{YA1}-V_{YB1})-(V_{YA2}-V_{YB2}) \quad [16]$$

substituting Formulae 1 and 2 into Formula 16, $$V_{YO}{}^*AC = (AC_{1A1}+AC_{1A2})+(AC_{1B1}+AC_{1B2})+(AC_{2A1}+AC_{2A2})-(AC_{2B1}+AC_{2B2}) \quad [17]$$

In the case of vibration under the Coriolis force, the output signal $V_{YO}{}^*AC$ is determined by substituting the relation of Formula 4 into Formula 17, as follows:

$$V_{YO}{}^*AC = -4(AC_{1A1} - AC_{1B1}) \quad [18]$$

In the case of vibration of the tuning fork and the displacement due to acceleration along the Y axis, the relations of Formulae 3 and 5 are substituted into Formula 17 to determine the output signal $V_{YO}{}^*AC$ as zero. In other words, the displacement due to acceleration along the Y axis and the vibration of the tuning fork have no effect on the output signal $V_{YO}{}^*AC$ of the third adder 53-3.

When vibrational members 201 and 202 of the tuning fork are subjected to oscillatory displacement due to the Coriolis force, the third adder 53-3 outputs the output voltage $V_{YO}$ indicated by the equation of Formula 18. This output voltage $V_{YO}$ is the difference between the voltage $AC_{1A1}$ applied to the upper capacitor 1A1 and the voltage $AC_{1B1}$ applied to the lower capacitor 1B2 and obviously represents the Coriolis force exerted on vibrational members 201 and 202 of the tuning fork.

In this case, too, the prior discussion relating to the operation of the control calculation section 52 holds. The output signal $V_{YO}{}^*AC$ of the third adder 53-3 generally assumes the following form, and its waveform assumes a curve as shown in FIG. 16A:

$$V_{YO}{}^*AC = K_Y \sin(2\pi f_X t) \times \sin(2\pi f_O t) \quad [19]$$

The amplitude of the envelope (shown by dashed line) of the waveform curve of the output signal $V_{YO}{}^*AC$ as shown in FIG. 18A is proportional to the vibratory displacement $\Delta Y$ along the Y axis of vibrational members 201 and 202 of the tuning fork. This corresponds to the coefficient $K_Y$ in Formula 19. Consequently, the coefficient $K_Y$ is given as $$K_Y = k_Y \Delta Y \quad [20]$$

where $k_Y$ is a proportionality constant.

The output signal $V_{YO}{}^*AC$ of the third adder 53-3 is applied to the demodulator 53-4, where it is synchronously detected by the signal of the reference frequency $f_O$. The output signal $V_Y$ of the demodulator 53-4 generally assumes the following form and has a waveform as shown in FIG. 18B:

$$V_Y = K_3 K_Y \sin(2\pi F_X t) \quad [21]$$

where $K_3$ is a proportionality constant. The coefficient $K_Y$ is determined from the output signal $V_Y$ of the demodulator 53-4 so that the displacement $\Delta Y$ along the Y axis of the vibrational members 201 and 202 of the tuning fork can be determined from Formula 20. The displacement $\Delta Y$ along the Y axis of vibrational members 201 and 202 due to the Coriolis force is proportional to the input acceleration $\Omega$. In this way, the angular velocity calculation section 53 outputs an output signal $V_Y$ proportional to the input acceleration $\Omega$.

Embodiments of the present invention were described above in detail. It should be understood by those skilled in the art, however, that the present invention is not limited to these embodiments and various modifications thereof are possible without departing from the scope and spirit of the invention.

According to this invention, the two cover members making up the casing are made of glass, and the base plate having a tuning fork may be made of single crystal silicon (Si). Since the two materials have substantially the same coefficient of thermal expansion, a highly accurate gyro apparatus can be provided which is not affected by temperature changes.

The vibration-type gyro apparatus according to the present invention is configured in such a manner that the vibrational members are vibrated by the electrostatic attraction exerted between the electrode sections of the vibrational members of the tuning fork and the electrodes of the casing, without using a drive means such as a drive coil or a piezoelectric element unlike conventional vibration-type gyro apparatusus. The vibration-type gyro apparatus according to the present invention, therefore, has a simple structure improving its accuracy and reliability.

Another advantage of the gyro apparatus of the present invention is that since the vibrational members are vibrated by the electrostatic attraction, a gyro apparatus is provided which is free from an external magnetic field, improving its overall accuracy.

Still another advantage of the gyro apparatus of the present invention is that since the vibratory displacement of the vibrational members under the Coriolis force is detected as a change in electrostatic capacitance, a highly accurate instrument free from external magnetic fields is provided.

A further advantage of the gyro apparatus of the present invention esults from the fact that the electrodes and the terminals connected to the electrodes are formed from a thin metal film and the electrode terminals can be connected to external electric circuits by way of a through hole, eliminating the need for additinal wires and connectors improving the reliability of the apparatus.

A still further advantage of the gyro apparatus of the invention is that since the center axis of the vibrational members is always maintained parallel with the tuning fork axis even when the support members of the vibrational members of the tuning fork are deflected, the vibratory displacement of the vibrational members is always linear along the X axis, and therefore, the displacement of the vibrational members due to the Coriolis force is always linear along the Y axis.

Yet another advantage of the gyro apparatus of the present invention resides in that since the vibratory displacement of the vibrational members is always linear along the X axis, the center axis of the vibrational members is always maintained parallel with the Z axis, i.e., the tuning fork axis, and therefore, the electrostatic attraction can be efficiently generated along X axis, thereby efficiently generating the vibrations of the vibrational members along the X axis.

A still further advantage of the gyro apparatus of the present invention is that since the displacement of the vibrational members attributable to the Coriolis force is always linear along the Y axis, the center axis of the vibrational members is always maintained parallel with the Z axis, i.e., parallel with the tuning fork axis, and therefore, the change in the capacitance of the capacitor along the Z axis for detecting the Coriolis force can be efficiently generated.

A yet further advantage of the gyro apparatus of the present invention is that since a stopper is provided for limiting the displacement of the vibrational members along the Y axis, the spacing between the electrode sections of the vibrational members and the corresponding electrodes on the casing side always assume a value other than zero so that the electrode sections and the electrodes are kept out of contact with each other.

Having described preferred embodiments of the invention with reference to the accompanying drawings, it is to be understood that the invention is not limited to those precise

What is claimed is:

1. A gyro apparatus comprising a tuning fork having an input axis of tuning fork along Z axis and vibrates at a predetermined frequency in the direction along X axis, and a casing for housing said tuning fork, wherein the Coriolis force generated along Y axis in said tuning fork is detected thereby to detect the angular velocity $\Omega$ around the Z axis, said gyro apparatus further comprising:

two vibration members supported in cantilever fashion and arranged along the XZ plane symmetrically with each other about Z axis, each of said vibration members having a tabular shape symmetrical about the center axis thereof;

a plurality of electrode sections formed on the two surfaces of said vibration members;

a plurality of electrodes formed in the internal space of said casing at positions corresponding to said electrode sections by being deviated outwardly or inwardly of the center axis of said vibration members with respect to said electrode sections; and a detection and drive circuit for applying a displacement detection AC voltage to capacitors each including one of said electrodes and a corresponding one of said electrode sections;

wherein the displacement along Y axis of said vibration members caused by said Coriolis force is detected by the change of said displacement detection AC voltage.

2. A gyro apparatus according to claim 1, wherein said detection and drive circuit is configured to apply a drive AC voltage in addition to said displacement detection voltage to said capacitors, and said vibration members are vibrated along X axis by said drive AC voltage.

3. A gyro apparatus according to claim 2, wherein each of said vibration members is supported by a U-shaped member having two parallel support members, and the center axis of said vibration members is maintained parallel with Z axis against the deflection of said two support members.

4. A gyro apparatus according to claim 3, further comprising two tabular cover members and a base plate held between said two tabular cover members, wherein said base plate includes said tuning fork and a frame-shaped portion surrounding said tuning fork integrally formed with each other, and the internal space of said casing is defined by said two cover members and said frame-shaped portion of said base plate held between said two cover members.

5. A gyro apparatus according to claim 4, wherein said casing is made of an insulating material, said electrodes are made of a metal thin film formed on the inner surfaces of said casing, said vibration members are made of a conductive material, and said electrodes are made of a plurality of protrusions formed on said vibration members.

6. A gyro apparatus according to claim 5, wherein said electrodes and said electrode sections are made of a multiplicity of elongate band-shaped portions arranged symmetrically about a plane passing through the center axis of said vibration members and parallel with the YZ plane.

7. A gyro apparatus according to claim 6, wherein the width of each of said band-shaped portions is several tens of $\mu$m.

8. A gyro apparatus according to claim 7 wherein said two tabular cover members are made of glass.

9. A gyro apparatus according to claim 8, wherein said base plate is made of single crystal silicon (Si).

10. A gyro apparatus according to claim 9, wherein said internal space of said casing is hermetically sealed and maintained in vacuum.

11. A gyro apparatus according to claim 10, wherein said casing is formed with a recess communicating with said internal space, and a getter material for maintaining vacuum is disposed in said recess.

12. A gyro apparatus according to claim 11, further comprising a stopper for limiting the displacement of said vibration members along Y direction, said stopper being made of a thin film of an insulating material formed on the surfaces of said electrode sections and/or said electrodes.

* * * * *